United States Patent
Kang

(10) Patent No.: US 7,986,734 B2
(45) Date of Patent: Jul. 26, 2011

(54) VIDEO CODECS, DATA PROCESSING SYSTEMS AND METHODS FOR THE SAME

(75) Inventor: Jung-Sun Kang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1957 days.

(21) Appl. No.: 11/018,762

(22) Filed: Dec. 22, 2004

(65) Prior Publication Data

US 2005/0149690 A1 Jul. 7, 2005

(30) Foreign Application Priority Data

Dec. 30, 2003 (KR) ........................ 10-2003-0100578

(51) Int. Cl.
*H04N 7/18* (2006.01)

(52) U.S. Cl. .............................. 375/240.16; 375/240.17

(58) Field of Classification Search . 375/240.01–240.29
See application file for complete search history.

(56) References Cited

U.S. PATENT DOCUMENTS

| | | | |
|---|---|---|---|
| 6,243,735 B1 | 6/2001 | Imanishi et al. | |
| 6,597,810 B1 | 7/2003 | Morishige | |
| 6,842,219 B2 | 1/2005 | Lee | |
| 2002/0009149 A1* | 1/2002 | Rodriguez et al. | ........ 375/240.25 |

FOREIGN PATENT DOCUMENTS

| | | |
|---|---|---|
| CN | 1272931 | 11/2000 |
| JP | 11-134203 | 5/1999 |
| JP | 2003-204556 | 7/2003 |
| KR | 1998-081499 | 11/1998 |
| KR | 2001-0023268 | 3/2001 |
| KR | 2003-0053920 | 7/2003 |
| WO | WO 99/67742 | 12/1999 |

* cited by examiner

*Primary Examiner* — Andy S Rao
(74) *Attorney, Agent, or Firm* — Harness, Dickey & Pierce, PLC

(57) ABSTRACT

Exemplary embodiments of the present invention provide a data processing system which may include a task scheduler for enabling a plurality of independent data processing units to be operable in pipelining streams and/or controlling pipelined operations to be differentiated by tasks, and a memory pool for storing data from the data processing units. The data processing units may perform tasks in response to task start signals provided from the task scheduler. The data processing units may complete the tasks as instructed by the task scheduler, transmit task end signals to the scheduler and transition into standby states.

27 Claims, 29 Drawing Sheets

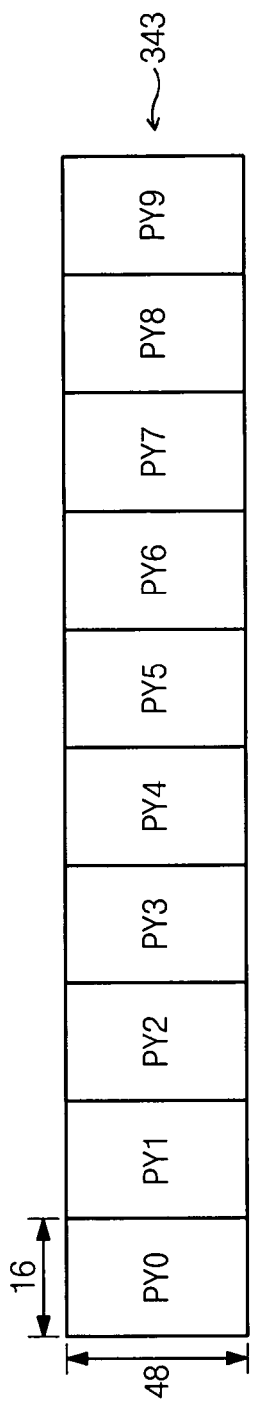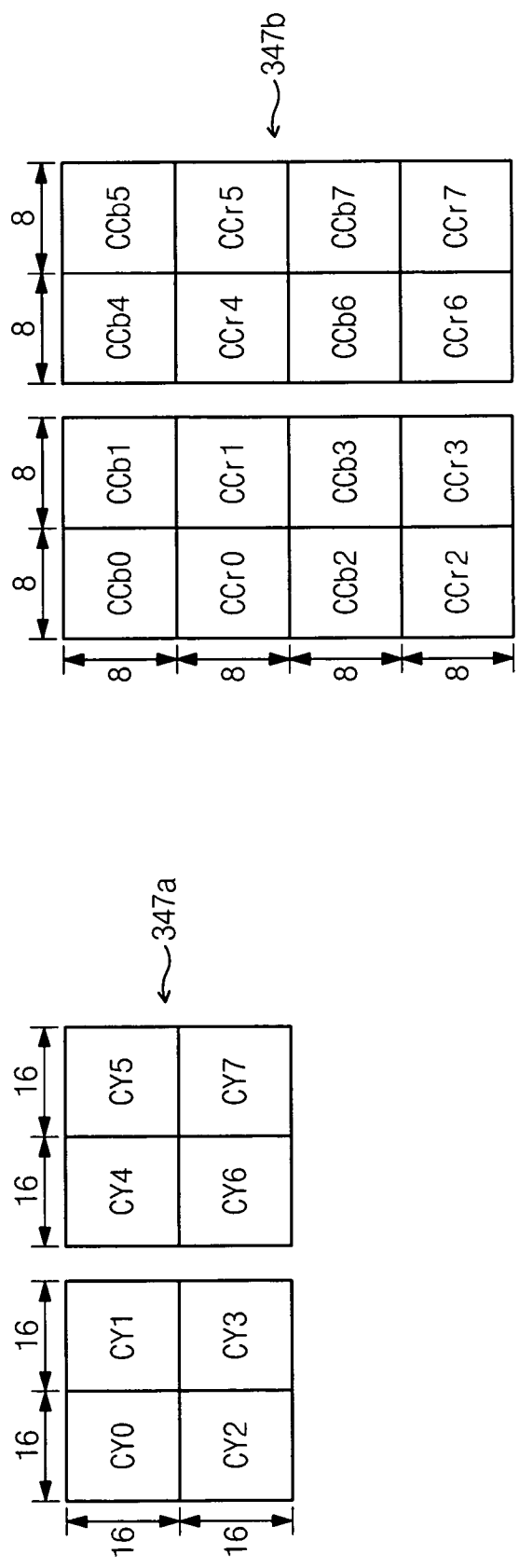
Fig. 5
Fig. 6A
Fig. 6B

Fig. 14A

| Task | T0 | T1 | T2 | T3 | T4 | T5 | T6 | T8 | T9 | T6 | T8 | T9 | T6 | T8 | T9 | ... |
|---|---|---|---|---|---|---|---|---|---|---|---|---|---|---|---|---|
| Internal Memory | PY access (PY0~PY5) | CY access (CY0~CY3) | CCb /CCr access | | | | PY access (PY6~PY9) | | | | | CY access (CY4~CY7) | | | CCb /CCr access | ... |
| ME | | | ME (CY0) | MV trans- fer | ME (CY1) | | MV trans- fer | ME (CY2) | | MV trans- fer | ME (CY3) | | MV trans- fer | ME (CY4) | | ... |
| MC | | | | MC (Y) | MC (C) | | MC (Y) | MC (C) | | MC (Y) | MC (C) | | MC (Y) | MC (C) | | ... |
| DCTQ | | | | | Y (CY0- MY0) | C | recon frame | Y (CY1- MY1) | C | recon frame | Y (CY2- MY2) | C | recon frame | Y (CY3- MY3) | C | ... |
| | | | | | | COEF Y0 | COEF Cb/Cr | COEF Y1 | COEF Cb/Cr | COEF Y2 | COEF Cb/Cr | COEF Y3 | | | | |

Fig. 14B

| Task | T1 | T2 | T4 | T5 | T6 | T8 | T9 | T6 | T8 | T9 | T6 | T8 | T9 | ... |
|---|---|---|---|---|---|---|---|---|---|---|---|---|---|---|
| Internal Memory | CY access | CCb/CCr access | | | | | | CY access | | | | | CCb/CCr access | ... |
| DCTQ | | | Y | C | recon frame | Y | C | recon frame | Y | C | recon frame | Y | C | ... |
| | | | | COEF Y | COEF Y | COEF Cb/Cr | COEF Y | COEF Y | COEF Cb/Cr | COEF Y | COEF Y | COEF Cb/Cr | COEF Y | ... |

Fig. 15A

| Task | T0 | T3 | T4 | T5 | T6 | T7 | T8 | T9 | T6 | T7 | T8 | T9 | T6 | ... |
|---|---|---|---|---|---|---|---|---|---|---|---|---|---|---|
| Internal Memory | PY access | | | | | | | | | PY access | | | | ... |
| MC | | MC (Y) | MC (C) | | MC (Y) | | | | MC (Y) | | MC (C) | | MC (Y) | ... |
| DCTQ | | COEF Y | COEF Cb/Cr | Y | C | recon frame | | | | COEF Y | COEF Cb/Cr | Y | C | recon frame | ... |

Fig. 15B

| Task | T3 | T4 | T5 | T6 | T7 | T8 | T9 | T6 | ... |
|---|---|---|---|---|---|---|---|---|---|
| DCTQ | COEF Y | COEF Cb/Cr | Y | C | recon frame | COEF Y | COEF Cb/Cr | Y | C | recon frame | ... |

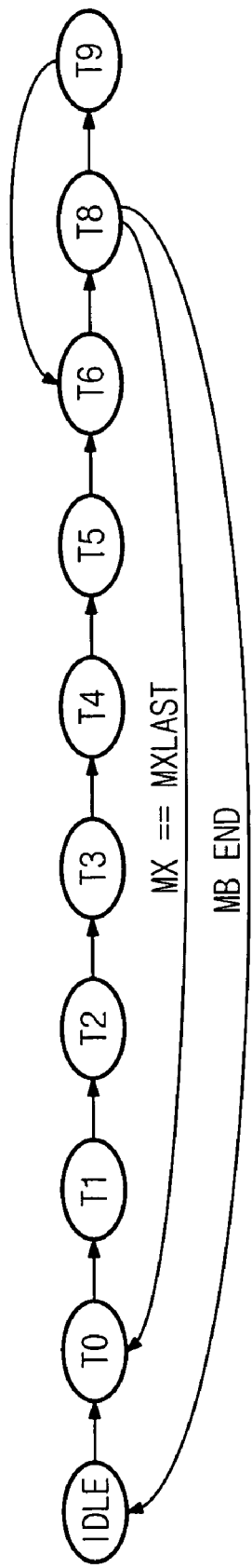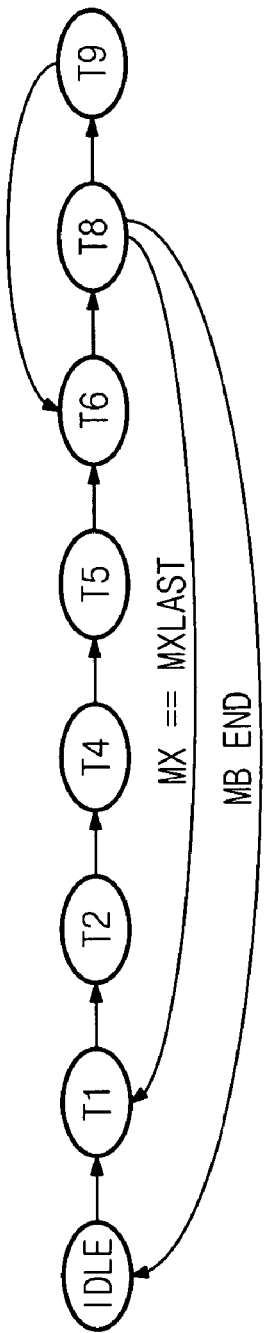
Fig. 16A
Fig. 16B

Fig. 21

| Fig. 21A |
|----------|
| Fig. 21B |

Fig. 21A

| Task | Encoding | | Decoding |
|------|----------|----------|----------|
|  | Inter_mode | Intra_mode | Inter_mode |
| T0 | py_write enable | — | py_write enable |
|  | If mem_mbx[5:2] == mxlast[5:2], then horizontal_end enable |  | If mem_mbx[5:2] == mxlast[5:2], then horizontal_end enable |
| T1 | cy_write enable | cy_write enable |  |
|  |  | If mem_mbx[5:2] == mxlast[5:2], then horizontal_end enable |  |
| T2 | ccbccr_write enable | ccbccr_write enable | — |
| T3 | If mem_mbx != M, then py_write enable | — | If mem_mbx != M, then py_write enable |
|  | If mem_mbx[5:2] == mxlast[5:2], then horizontal_end enable |  | If mem_mbx[5:2] == mxlast[5:2], then horizontal_end enable |

Fig. 21B

| Task | Encoding | | Decoding | |
|---|---|---|---|---|
| | Inter_mode | Intra_mode | Inter_mode | Intra_mode |
| T6 | If (mx[1:0] == 2'b11 && mem_mbx != M), then py_write enable<br><br>If mem_mbx[5:2] == mxlast[5:2], then horizontal_end enable | — | If (mx[1:0] == 2'b11 && mem_mbx != M), then py_write enable<br><br>If (mx == M), then horizontal_end disable elseif mem_mbx[5:2] == mxlast[5:2], then horizontal_end enable | |
| T8 | If (mx == M), then horizontal_end disable<br><br>If (mx[1:0] == 2'b10 && mem_mbx != M), then cy_write enable | If (mx == M), then horizontal_end disable<br><br>If (mx[1:0] == 2'b10 && mem_mbx != M), then cy_write enable | — | |
| T9 | If (mx[1:0] == 2'b11 && mem_mbx != M), then ccbccr_write enable | If (mx[1:0] == 2'b11 && mem_mbx != M), then ccbccr_write enable<br><br>If mem_mbx[5:2] == mxlast[5:2], then horizontal_end enable | | |

Fig. 22

| Task | Encoding |
|---|---|
| | Inter_mode |
| T2 | me_start enable |
| T3 | mv_write enable |
| T4 | If (me_mbx != M), then me_start enable |
| T6 | If (me_mbx != M), then mv_write enable |
| T8 | If (me_mbx != M), then me_start enable |

Fig. 23

| Task | Encoding | Decoding |
|---|---|---|
| | Inter_mode | Inter_mode |
| T3 | mc_y_start enable | mc_y_start enable |
| T4 | mc_cbcr_start enable | mc_cbcr_start enable |
| T6 | If (mc_mbx != M), then mc_y_start enable | If (mc_mbx != M), then mc_y_start enable |
| T7 | - | mc_cbcr_start enable |
| T8 | If (mc_mbx != M), then mc_cbcr_start enable | - |

Fig. 24

| Task | Encoding | Decoding |
|---|---|---|
| T3 | Inter/Intra_mode | Inter/Intra_mode |
| T4 | dctq_y_start enable | coef_y_read enable |
| T5 | dctq_cbcr_start enable | coef_cbcr_read enable<br>iqidct_y_start enable |
| T6 | coef_y_write enable | iqidct_cbcr_start enable |
| T7 | recon_write enable | recon_write enable |
| T8 | If (dctq_mbx != M), then dctq_y_start enable<br>coef_cbcr_write enable | coef_y_read enable |
| T9 | dctq_cbcr_start enable<br>coef_y_write enable | coef_cbcr_read enable<br>iqidct_y_start enable<br>iqidct_cbcr_start enable |

US 7,986,734 B2

VIDEO CODECS, DATA PROCESSING SYSTEMS AND METHODS FOR THE SAME

CROSS-REFERENCE TO RELATED APPLICATIONS

This U.S. non-provisional patent application claims priority under 35 U.S.C. §119 of Korean Patent Application 2003-100578 filed on Dec. 30, 2003, the entire contents of which are hereby incorporated by reference.

BACKGROUND OF THE INVENTION

The motion pictures experts group (MPEG) defines a standard for compressing and restoring motion pictures. The MPEG techniques may compress motion pictures with the parameters of temporal and spatial redundancies. The temporal redundancy may arise from pictures which may appear to overlap in time over successive frames. The special redundancy may be determined from overlapped image patterns in a single frame.

As illustrated in FIG. 1, a conventional video codec (coder and/or decoder) may be comprised of frame memories 11, 13, and 15 for storing input picture data, a discrete cosine transformer (DCT) 17, an inverse DCT (IDCT) 23, a quantizer (Q) 19, an inverse quantizer (IQ) 21, a variable length coder (VLC) 29, a motion estimator (ME) 25, and a motion compensator (MC) 27.

The frame memory 11 may store input picture data which may be a current frame. The frame memory 13 may store picture data reconstructed prior to the current frame, which may be a reconstructed frame or a previous frame. The frame memory 15 may store picture data with being motion-compensated, which may be referred to as a motion-compensated frame.

In an inter-mode, motion compensation may be carried out in a macroblock (MB) which may have 16×16 pixels. The motion estimator 27 may obtain a motion vector by locating a motion vector substantially similar to a current macroblock, which may be read from the frame memory 11, in a reconstructed frame which may be stored in the frame memory 13.

The motion compensator 25 may obtain a motion-compensated frame from the motion vector provided by the motion estimator 27 and the previous frame provided by the frame memory 13. Image differential data, which may result from a variation between the motion-compensated frame provided by the frame memory 15 and the current frame provided by the frame memory 11, may be processed by the DCT 17 in a unit block of 8×8 pixels, and quantized through the quantizer 19. The quantized image differential data may be restored by the IDCT 21 and the inverse quantizer 23 and may be used in generating a reconstructed frame and/or the motion-compensated image data.

The VLC 29 may perform an entropy coding operation for the quantized image differential data and/or the motion vector.

An intra-mode may not process the motion compensation and a current frame which may be provided from the frame memory 11 may be processed by DCT processes and/or quantization and may be put into a variable length coding operation.

A conventional video codec may be associated with a common bus architecture shared by the plurality of data processing units such as the DCT, the IDCT, the quantizer, the inverse quantizer, the VLC, the motion estimator, and the motion compensator. Sharing data between the processing units may become more difficult and requirements for bandwidths of external memories may increase. Operations of the data processing units may be restricted by data volume operable on the common bus.

SUMMARY OF THE INVENTION

Exemplary embodiments of the present invention provide video codecs (i.e. coders and/or decoders), data processing systems, and methods for the same, which may reduce memory and/or bandwidth requirements.

Exemplary embodiments of the present invention may improve the performance of data processing systems. Implementing, maintaining, and/or modifying the data processing units, in accordance with exemplary embodiments of the present invention may control pipelining operations of the data processing units with tasks dependently or independently by the task start and/or end signals.

In exemplary embodiments of the present invention the data processing units may share the internal data memories and may be able to reduce external memory requirements, for example, bandwidth requirements.

Exemplary embodiments of the present invention may reduce power consumption in data processing systems.

In an exemplary embodiment of the present invention a data processing system may be comprised of a plurality of data processing units and a task scheduler which may control the data processing units to be operable in pipelining operations by tasks which may be associated with a plurality of operations.

In exemplary embodiments of the present invention the task scheduler may apply task start signals to the data processing units and may receive task end signals from the data processing units. The data processing units may perform tasks in response to the task start signals and may apply the task end signals to the task scheduler to inform ends of the tasks.

In exemplary embodiments of the present invention the data processing system may further comprise a control register which may establish functions of the data processing units and an internal memory pool which may store data used in the operations of the data processing units. The data processing units may be comprised of a discrete cosine transforming quantizer which may include a discrete cosine transformer, an inverse discrete cosine transformer, a quantizer, and an inverse quantizer, a motion estimator, and a motion compensator, which may code, for example, MPEG motion pictures.

In exemplary embodiments of the present invention the internal memory pool may comprise motion-compensated luminance and/or chrominance data memories which may store luminance and/or chrominance data motion-compensated by the motion compensator; reference-macroblock luminance and/or chrominance data memories which may store luminance and/or chrominance data of a currently input frame retrieved from a frame memory, and a quest-field data memory which may store luminance data which may be obtained from a reconstructed frame, which may be prior to the currently input frame, retrieved from the frame memory.

In exemplary embodiments of the present invention the quest-field data memory may provide luminance and/or chrominance data of a previous frame to the motion estimator and/or the motion compensator. The motion-compensated luminance and/or chrominance data memories may provide motion-compensated luminance and/or chrominance data to the discrete cosine transformer and the inverse discrete cosine transformer. The reference-macroblock luminance and/or chrominance data memories may provide luminance data of a current frame to the motion estimator and luminance and/or chrominance of the current frame to the discrete cosine transformer.

In exemplary embodiments of the present invention, data processing units may be provided with a system clock during periods between the task start signals and the task end signals.

In exemplary embodiments of the present invention the motion estimator and/or the motion compensator may not receive a system clock when the data processing system may operate in an intra-coding mode by the control register, the motion estimator may not receive the system clock when the data processing system may operate in an inter-decoding mode, and the memory pool, the motion estimator, and/or the motion compensator may not receive a system clock when the data processing system may operate in an intra-decoding mode.

In another exemplary embodiment of the present invention a video codec may comprise data processing units which may include a discrete cosine transforming quantizer including a discrete cosine transformer, an inverse discrete cosine transformer, a quantizer, and an inverse quantizer, which may code MPEG motion pictures. The video codec may further include a motion estimator, a motion compensator, an internal memory pool which may store data shared by the data processing units, a task scheduler which may control the data processing units to be operable in pipelining operations by tasks associated with a plurality of operations, and a control register which may establish functions of the data processing units.

In exemplary embodiments of the present invention the task scheduler may generate the task start signals to instruct the data processing units. The data processing units may transition into operation states and may perform tasks in response to the task start signals which may be provided from the task scheduler. The data processing units may provide the task end signals to the task scheduler when the tasks instructed by the task start signals may be ended. The task end signals may inform the task scheduler of ends of the tasks. The data processing units may transition to a standby state to wait for the next task instructions to be provided from the task scheduler. The task scheduler may generate the next task start signals and may perform functions of the tasks in response to the task end signals which may be provided from the data processing units.

In exemplary embodiments of the present invention the motion estimator may estimate a motion and/or transfer a motion vector. The motion compensator may perform motion compensation of luminance and/or chrominance data. The discrete cosine transforming quantizer may perform DCTQ operations with luminance and/or chrominance data, and may write a reconstructed frame. The frame memory controller of the memory pool may control writing luminance data of a previous frame, and luminance and/or chrominance data of a current frame into the data memories of the memory pool from the frame memory. The luminance and/or chrominance data may be processed with variable length coding and/or decoding operations by a variable length coder and/or decoder.

In exemplary embodiments of the present invention a memory pool may comprise motion-compensated luminance and/or chrominance data memories which may store luminance and/or chrominance data motion-compensated by the motion compensator, reference-macroblock luminance and/or chrominance data memories which may store luminance and/or chrominance data of a currently input frame retrieved from a frame memory, a quest-field data memory which may store luminance data which may be obtained from a reconstructed frame prior to the currently input frame retrieved from the frame memory an internal data memory controller which may provide data to the data processing units in response to internal data memory control signals which may be supplied from the data processing units, a frame memory controller which may access the frame memory and store data into the reference-macroblock data memory and/or the quest-field data memory, and a task controller which may transfer task start signals to the frame memory from the task scheduler and transfer task end signals to the task scheduler when the tasks may be completed.

In exemplary embodiments of the present invention the motion estimator may comprise a motion-estimating engine which may evaluate a motion vector with a luminance macroblock retrieved from the quest-field data memory and/or the reference-macroblock luminance memory, a motion-vector transfer controller which may transfer the motion vector to the motion compensator and/or the variable length coder, a motion-estimating task controller which may receive the task start signal from the task scheduler and may transfer the task end signal to the task scheduler, and a motion-estimating internal data memory read controller which may generate an internal data memory control signal to retrieve luminance data from the quest-field data memory and/or the reference-macroblock luminance memory.

In exemplary embodiments of the present invention the motion compensator may comprise a motion-vector analyzer which may analyze a motion vector which may be provided from the motion estimator in a coding mode and/or from the variable length decoder in a decoding mode, a motion-compensating engine which may perform motion compensation with luminance and/or chrominance data according to the analyzed motion vector, a motion-compensating task controller which may receive a task start signal from the task scheduler and may transfer the task end signal to the task scheduler, a motion-compensating internal data memory read/write controller which may generate an internal data memory control signal to retrieve data from the quest-field data memory and/ or an internal data memory control signal to the motion-compensated luminance and/or chrominance data into the motion-compensated data memories, and a frame-memory read controller which may generate a frame-memory read control signal to retrieve chrominance data from the frame memory.

In exemplary embodiments of the present invention the discrete cosine transforming quantizer may comprise a DCTQ task controller which may receive a task start signal from the task scheduler and may transfer the task end signal to the task scheduler, a DCTQ internal data memory read controller which may generate an internal data memory control signal to retrieve luminance and/or chrominance data from the reference-macroblock data memories and/or the motion-compensated luminance and/or chrominance data from the motion-compensated data memories, and a DCTQ frame memory write controller which may store a reconstructed frame into the frame memory.

In another exemplary embodiment of the present invention a video codec may comprise data processing units which may include a discrete cosine transforming quantizer. The discrete cosine transforming quantizer may include a discrete cosine transformer, an inverse discrete cosine transformer, a quantizer, and an inverse quantizer, which may code MPEG motion pictures. The video codec may further include a motion estimator, a motion compensator, and an internal memory pool which may store data shared by the data processing units. The motion estimator and the motion compensator may share the quest-field data memory, the discrete cosine transformer and the inverse discrete cosine transformer may share the motion-compensated data memory, and the motion estimator and the discrete cosine transformer may share the reference-macroblock data memory.

In exemplary embodiments of the present invention a video codec may further comprise a task scheduler which may control the data processing units to be operable in pipelining operations by tasks associated with a plurality of operations. The task scheduler may apply task start signals to the data processing units and may receive task end signals from the data processing units. The data processing units may perform tasks in response to the task start signals and may apply the task end signals to the task scheduler which may indicate ends of the tasks.

In another exemplary embodiment of the present invention a method of processing data may comprise performing tasks by the data processing units in response to task start signals which may be provided from a task scheduler, generating task end signals by the data processing units which may indicate ends of the tasks when the tasks may be completed, establishing standby states in the data processing units to wait for the next task start signals, and transitioning tasks by the task scheduler in response to the task end signals.

BRIEF DESCRIPTION OF THE DRAWINGS

The accompanying drawings are included to provide a further understanding of the exemplary embodiment of the invention. The drawings illustrate exemplary embodiments of the present invention and serve to explain principles of the present invention by way of example. In the drawings:

FIG. 5 illustrates the an example of a composition of a quest field memory which may be included in the memory pool shown in FIGS. 2 and 3;

FIGS. 6A and 6B illustrate the examples of compositions of reference macroblock luminance and chrominance memories which may be included in the memory pool shown in FIGS. 2 and 3;

FIGS. 14A and 14B illustrate an example of the feature of pipeline operations which may be included in an inter-encoding mode and/or an intra-encoding mode;

FIGS. 15A and 15B illustrate an example of the feature of pipeline operations which may be included in an inter-decoding mode and/or an intra-decoding mode;

FIGS. 16A through 16D are examples of processing diagrams illustrating examples of task flows in the pipelining operations in the modes, respective to FIGS. 14A, 14B, 15A, and 15B;

FIGS. 21 through 24 show examples of algorithm patterns which may generate task control signals respective to the memory pool, the motion estimator, the motion compensator, and/or the discrete cosine transform quantizer;

DETAILED DESCRIPTION OF PREFERRED EMBODIMENTS

Exemplary embodiments of the present invention will be described below in more detail with reference to the accompanying drawings. The exemplary embodiments of the present invention may, however, be embodied in different forms and should not be construed as limited to the exemplary embodiments set forth herein. Rather, these exemplary embodiments are provided such that this disclosure will be thorough and complete, and may fully convey the scope of the invention to those skilled in the art. Like numerals refer to like elements throughout the specification.

Figure 1:
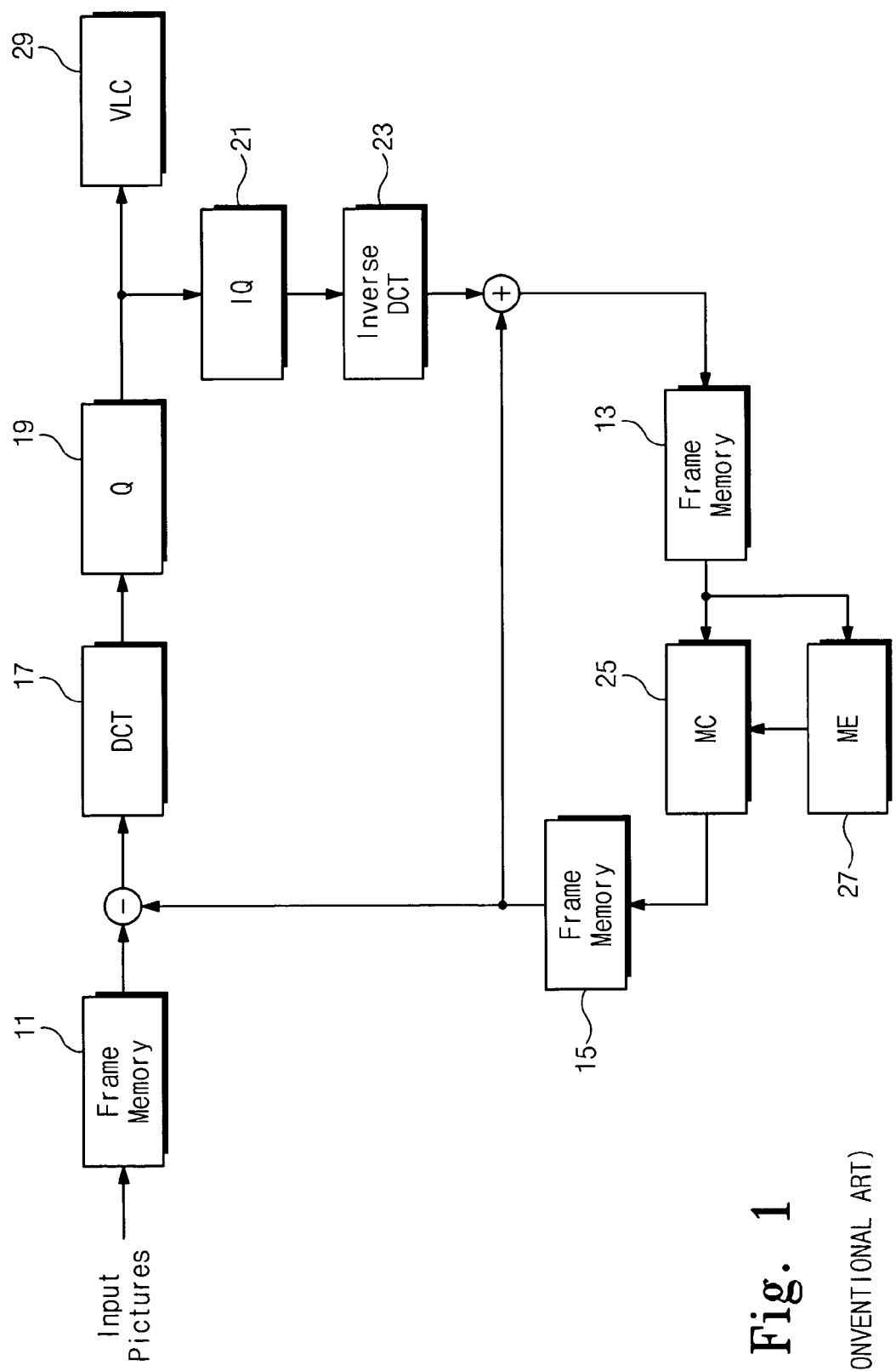
FIG. 1 is a block diagram illustrating an example of a functional structure of a conventional video codec.
Figure 2:
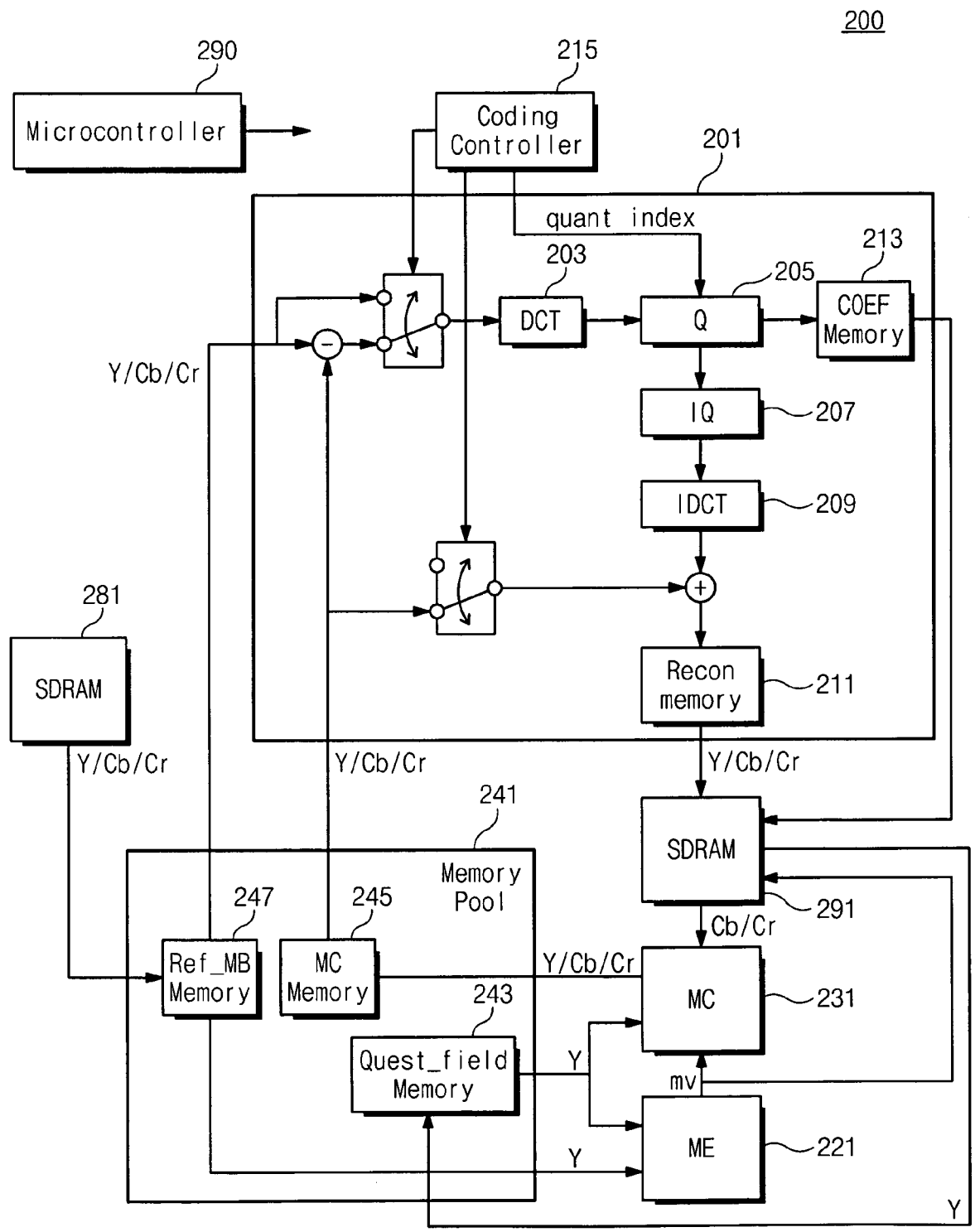
FIG. 2 is a block diagram illustrating an exemplary embodiment of a video codec in accordance with the present invention, which may include a memory pool.

FIG. 2 illustrates an example of a functional structure of a video codec as a data processing apparatus in accordance with an exemplary embodiment of the present invention, which may reduce memory bandwidth requirements. The video codec 200 may be comprised of data processing units 201, 221, and 231, which may perform data processing operations independently, and a microprocessor 270, which may control the operations of the processing units. The data processing units 201, 221, and 231 may be a DCTQ, a motion estimator (ME), and/or a motion compensator (MC), respectively. The DCTQ 201 may be constructed of a DCT 203, a quantizer (Q) 205, an inverse quantizer (IQ) 207, and an IDCT 209. A coding controller 215 may manage operations of the inter-mode, the intra-mode, and/or a quantizing index.

The video codec 200 may include a memory pool 241 which may reduce memory bandwidth requirements. The memory pool 241 may be comprised of a quest-field memory (or previous frame memory) 243, a motion-compensated memory 245, and/or a reference-macroblock memory (or current frame memory) 247, which may be internal memories of the video codec 200. The internal memories 243, 245, and/or 247 may provide data which may be shared by the data processing units 201, 221, and 231. The motion estimator 221 and the motion compensator 231 may share the quest-field memory 243, and/or the DCT 203 and the IDCT 209 may share the motion-compensated memory 245. The motion estimator 231 and the DCT 203 may share the reference-macroblock memory 247.

The internal memory pool 241 may supply data to the data processing units in response to control signals (internal memory control signals) which may be provided by the data processing units.

Frame memories 281 and/or 291 may store input image data (a current frame) which may be processed presently, and/or reconstructed image data (a reconstructed frame or a previous frame) prior to the current input image data. The frame memories 281 and 291 may be burst-accessible synchronous DRAMs. Luminance and/or chrominance data, which may be stored in the frame memories 281 and 291, may be written into the internal memories 243 and 247.

The DCTQ 201 may include a reconstructing memory (recon-memory) 211 which may temporarily store a reconstructed frame, and/or a quantizing coefficient memory (COEF memory) 213 for storing quantizing coefficients.

The video codec 200 may act as an encoder and/or a decoder, either or both of which may be in an inter-mode or an intra-mode, under the control of the microcontroller 290.

The video codec 200 may perform intra-coding and/or inter-coding. The intra-coding operation may reduce the spatial redundancy of a current input frame, which may improve the performance of the DCT and/or improve the quantization for the current frame. The inter-coding operation may reduce the temporal redundancy between frames (for example, successive frames), which may improve the motion estimation, motion compensation, a DCT for image differential data between a current frame and/or a motion-compensated frame (i.e., a predictive frame), and/or improve quantization.

The video codec 200 may perform another inter-mode for the data processing units. The motion estimator 221 may calibrate a motion between the input current frame and the previous frame (i.e., a reconstructed frame) for luminance components (Y) in the unit of a macroblock of 16×16 pixels. A macroblock may be substantially similar (for example, a matching) to a macroblock of the current frame, which may be provided by the reference macroblock memory 247 in a questing field of the previous frame, which may be provided by the quest-field memory 243, and may estimate the displacement (for example, a motion vector; MV) between the two macroblocks. The estimated motion vector MV may be used in the motion compensation and/or the variable length coding processes. The questing field may be comprised of a macroblock which may correspond to a current macroblock of the previous frame and eight macroblocks. The questing field may be constructed of 48×48 pixels (i.e., nine macroblocks).

The motion compensator 231 may generate a luminance and/or chrominance data block (i.e., predictive data) which may be include a motional displacement from a luminance (Y) and/or chrominance (Cb/Cr) block of the previous frame, which may be provided by the quest-field memory 243 and the frame memory 291, which may be in accordance with the estimated motion vector MV obtained by the motion estimator 221. The motion-compensated luminance and/or chrominance data block may be stored in the motion-compensated memory 245.

The DCTQ 201 may perform an encoding operation with the motion-compensated data block (for example, the predictive data) by utilizing the DCT 203 and the quantizer 205, and may perform a decoding operation by utilizing the inverse quantizer 207 and the IDCT 209. The DCTQ 201 may perform operations of DCT and/or quantization using the DCT 203 and/or the quantizer 205 for image differential data which may be obtained by subtracting the motion-compensated luminance and/or chrominance data block (the predictive data), which may be provided by the motion-compensated memory 245, from a luminance and/or chrominance data block of the current frame which may be provided by the reference macroblock memory 247, and may store the quantizing coefficients into the quantizing coefficient memory 213. The quantized image differential data may be converted into an inverse-quantized and/or IDC-transformed data by the inverse quantizer 207 and/or the IDCT 209, and may be added to the motion-compensated luminance and/or chrominance data to form the reconstructed frame which may be stored (for example, temporarily) in the reconstructed frame memory 211. The DCTQ 201 may process the data in the unit of 8×8 pixels. The reconstructed frame which may be stored in the reconstructed frame memory 211 may be sent to an external frame memory 291 and may perform motion compensation.

The DCTQ 201 may perform a variable length encoding operation for the motion vector MV, which may be calibrated by the motion estimator 221 and/or the quantizing coefficient which may be stored in the quantizing coefficient memory 213. The variable length encoding operation may be performed by hardware with the VLC and/or by software with an appropriate program. The motion vector and/or the quantizing coefficient may be written in the external frame memory 291. The VLC may access the quantizing coefficient memory 213 and utilize the quantizing coefficient (or coefficients) which may be stored therein. The VLC may access the motion estimator 221 and utilize the motion vector which may be held therein. The VLC may include the motion vector MV and/or the quantizing coefficient from the motion estimator 221 and/or the quantizing coefficient memory 213. The VLC and/or the DCTQ 201 may share the quantizing coefficient memory 213. The VLC may generate a ready/busy signal which may inform the DCTQ 201 of an active state. The quantizing coefficient may have be stored in the memory 213 and the DCTQ 201, may generate a signal informing the completion of writing the quantizing coefficient into the memory 213, which may enable the VLC to access to the memory 213 and may perform the VLC operation which may include the quantizing coefficient.

The video codec 200 may reduce spatial redundancy and a current frame, which may be provided from the reference macroblock memory 247, may be converted into DC-transformed data by the DCT 203 and may be quantized by the quantizer 205. A quantizing coefficient COEF may be created from the quantization may be stored in the quantizing coefficient memory 213 which may be an internal memory. The quantizing coefficient COEF may be entropy-encoded by software or by the VLC.

The video codec 200 may act as a decoder and may not perform motion estimation. The inter-decoding mode may include motion compensation, decoding for a quantizing coefficient of entropy-encoded image differential data, and restore a frame by a motion vector. The motion compensator 231 may perform motion compensation for luminance and/or chrominance data which may include reference to an entrophy-decoded motion vector. The DCTQ 201 may perform an inverse quantization and/or IDCT operation for the entrophy-decoded quantizing coefficient of the luminance and/or chrominance data, and may restore a frame by adding the inverse-quantized and/or IDC-transformed quantizing coefficient to the motion-compensated luminance and/or chrominance data.

The intra-decoding mode need not perform the motion compensation, as may have been performed in the inter-decoding mode, but may include operations of entrophy-decoding and/or frame decoding.

The motion estimator 221 and the motion compensator 231 may share the quest-field memory 243, and the DCT 203 and the IDCT 209 may share the motion-compensated memory 245. The motion estimator 231 and the DCT 203 may share the reference macroblock memory 247, and thus, memory bandwidth requirements may be reduced.

Figure 3:
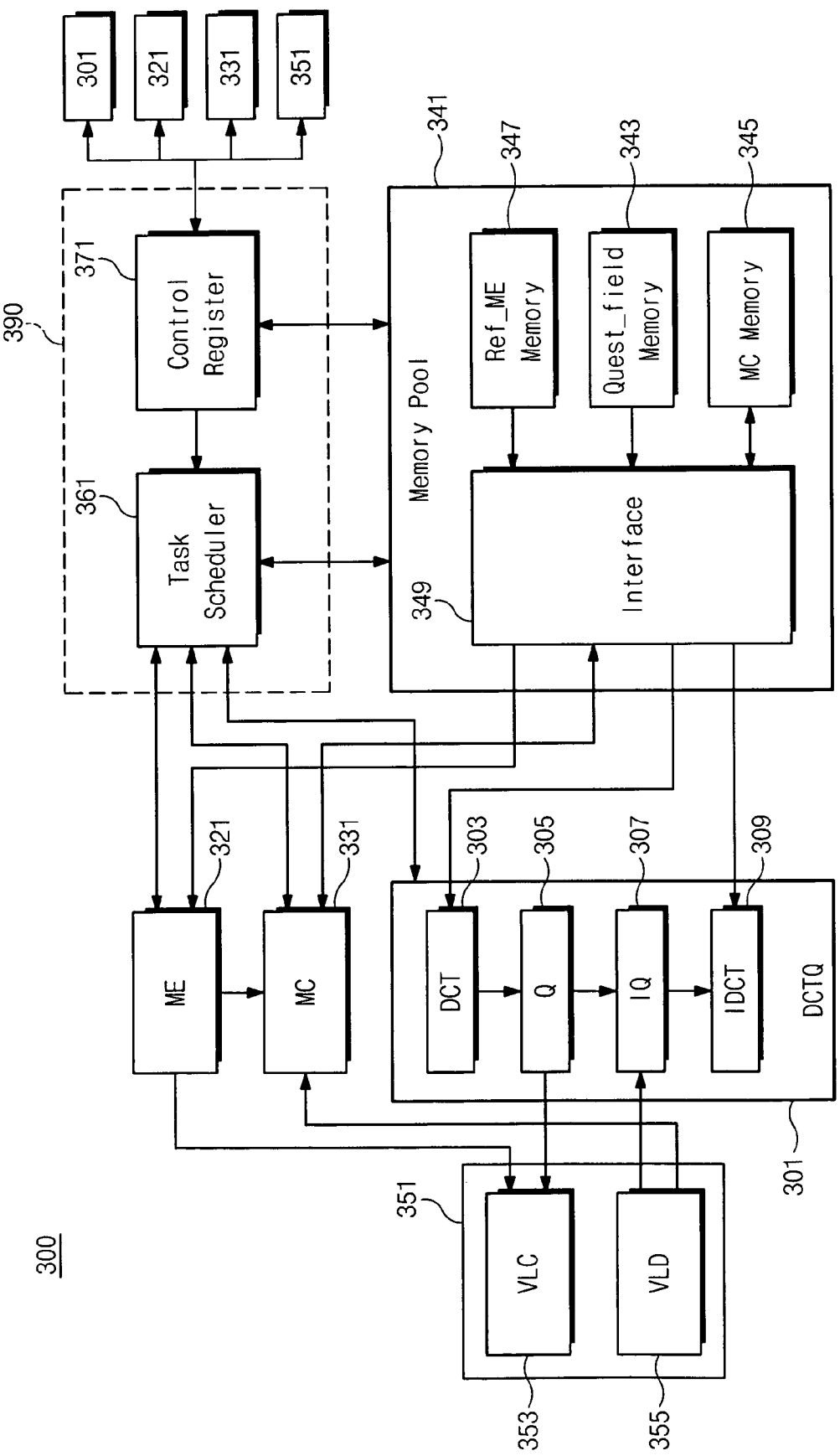
FIG. 3 a block diagram illustrating an exemplary embodiment of a video codec in accordance with the present invention, which may include a memory pool and a task scheduler.

FIG. 3 is a block diagram illustrating another exemplary embodiment of the video codec 300 as a data processing system in accordance with the present invention. The video codec 300 may be comprised of a microcontroller 390 which may include a task scheduler 361 and a control register 371, a DCTQ 301, a motion estimator 321, a motion compensator 331, data processing units which may include a variable length coder and decoder (VLCD) 351, and a memory pool 341. The DCTQ 301 may include a DCT 303, a quantizer 305, inverse quantizer 307, and IDCT 309.

The VLCD 351 may perform entrophy-encoding and/or decoding operations. The entrophy-encoding and/or decoding operations may also be performed by software with an appropriate algorithm.

The control register 371 may establish functional configurations of the video codec 300, for example, frame starting, intra-coding, inter-coding, encoding, decoding, and so on.

The memory pool 341 may include the quest-field memory 343, the motion-compensated memory 345, and/or the reference macroblock memory 347. The data processing units 301, 321, and 331 may share common data by way of an interface network 349. The motion estimator 321 and/or the motion compensator 331 may share the quest-field memory 343. The DCT 303 and the IDCT 309 may share the motion-compensated memory 345. The motion estimator 331 and the DCT 303 may share the reference macroblock memory 347.

The task scheduler 361 may control pipelining operations of the data processing units. The task scheduler 361 may output a command (or a control signal), i.e., a task start signal, which may instruct the DCTQ 301, the motion estimator 321, the motion compensator 331, and/or the memory pool to execute a task. The data processing units 301, 321, and 331 and the memory pool 341, which may receive the task start signal from the task scheduler 361, may also perform a corresponding task. The data processing units 301, 321, and 331 and the memory pool 341 may send a task end signal to the task scheduler 361 and may remain in a standby state awaiting another task start signal. The task scheduler 361, which may receive the task end signal from the data processing units 301, 321, 331 and/or the memory pool 341, may generate another task start signal to instruct the data processing units 301, 321, 331 and/or the memory pool 341 to execute another task (for example, the next task).

The VLCD 351 may perform a VLCD operation for a motion vector, which may be provided from the motion estimator 221 and/or the quantizing coefficient COEF stored in the quantizing coefficient memory 213 of FIG. 2. The motion vector may be provided to an external frame memory 291 of FIG. 2 (for example, the motion vector may be stored in the external frame memory from the motion estimator), and may accompany the quantizing coefficient (i.e., the quantizing coefficient which may also be stored in the external frame memory from the quantizing coefficient memory).

The VLCD 351 may generate a ready/busy signal to inform the DCTQ 301 of an active state. The DCTQ 301 may write the quantizing coefficient COEF in the quantizing coefficient memory and may generate a signal informing the completion of an operation which may enable the VLCD 351.

The task scheduler 361 may perform tasks on the data processing units independently. The motion estimator 321 may perform a task of estimating motion for the luminance data block, and/or writing the motion vector in the external frame memory. The motion compensator 331 may perform tasks on the luminance and/or chrominance data blocks independently, for example, tasks for compensating motions respective to the luminance and/or chrominance data blocks. The DCTQ 301 may perform tasks on the luminance and/or chrominance data blocks independently, for example, DCTQ tasks (DCT, quantizing, inverse quantizing, IDCT) respective to the luminance and/or chrominance data blocks and/or a task of storing a reconstructed frame. The VLCD 351 may perform a task of entrophy-encoding and/or decoding luminance components under control of the motion compensator 331 and the DCTQ 301, a task of entrophy-encoding and/or decoding for a quantizing coefficient of chrominance components, and/or a task of VLCD for the motion vector.

The memory pool 341 may store a luminance component of a previous frame into the quest-field memory 343 from the frame memories 281 and/or 291 of FIG. 2, and may store luminance and/or chrominance components of a current frame into the motion-compensated memory 345.

Data stored in the internal memories 343, 345, and/or 347 may be accessed by the DCTQ 301, the motion estimator 321, and/or the motion compensator 331.

Figure 4:
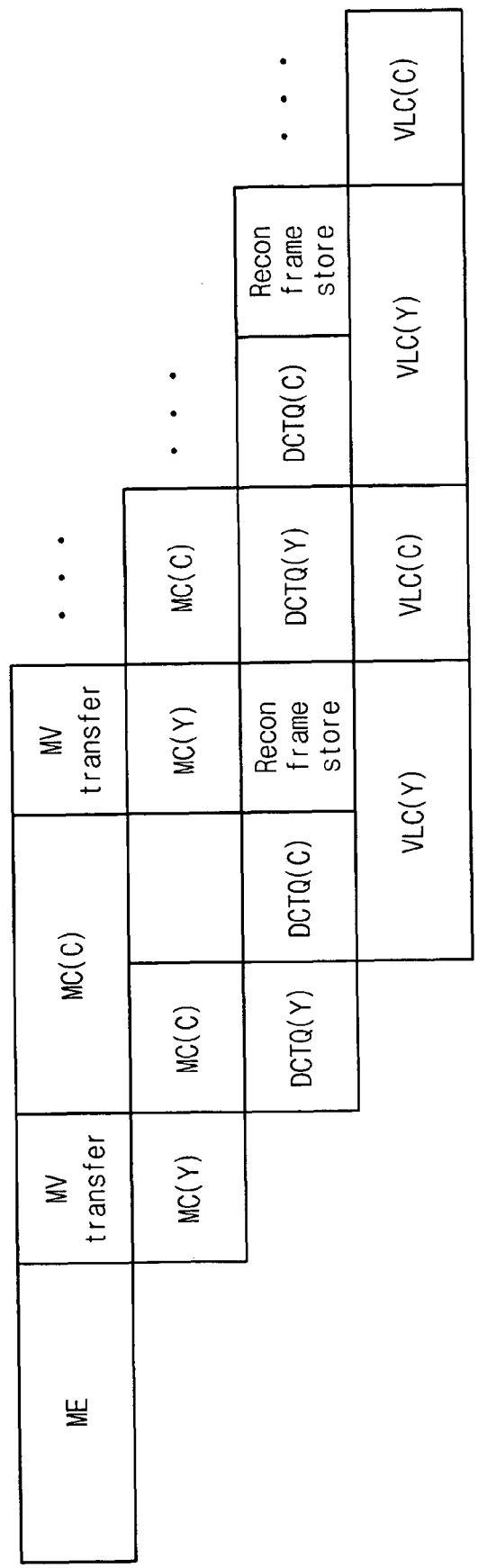
FIG. 4 is a schematic diagram illustrating an example of a pipelining operation in an encoding mode of the exemplary embodiment video codec shown in FIG. 3.

Tasks operable with the data processing units may be controlled by the task scheduler 361. FIG. 4 illustrates an example of the pipelining operation in an encoding mode of an exemplary embodiment of the video codec 300 shown in FIG. 3.

Luminance components of current and/or previous frames may be moved into the reference macroblock luminance memory and/or the motion-compensated memory from the frame memory in response to a task start signal of the task scheduler 361. The motion estimator 321 may begin motion estimation to generate a corresponding motion vector, and the motion compensator 331 may perform motion compensation for the luminance and/or chrominance components with reference to the resultant motion vector. The VLCD 351 need not perform motion compensation for the luminance components and the motion vector may be written into external frame memory. The DCTQ 301 may perform the DCTQ task for the chrominance components and the task of storing a reconstructed frame thereof. The DCTQ task for the luminance components by the DCTQ 301 may be completed and the entrophy-coding operation may be performed with a quantizing coefficient thereof.

Examples of structural configurations of the memory pool 341, which may more efficiently pipeline operations for tasks with the data processing units and/or reduce the external memory bandwidth requirements, are illustrated in FIGS. 5, 6A, 6B, 7A, and 7B. A questing field for motion compensation may be set in the range of [−16, 16], i.e., the questing field may be 48×48 pixels, in a systemic condition in which may include a single access mode with a burst length of 4, 8, or 16. The memory pool 341 may include a quest-field memory, a reference macroblock memory, and/or a motion-compensated memory.

Figure 7A:
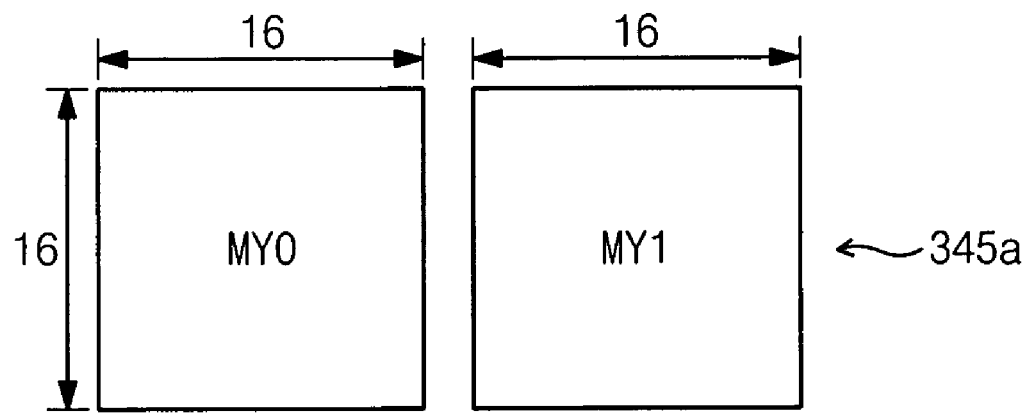
FIGS. 7A and 7B illustrate examples of compositions of motion-compensated luminance and chrominance memories which may be included in the memory pool shown in FIGS. 2 and 3.
Figure 7B:
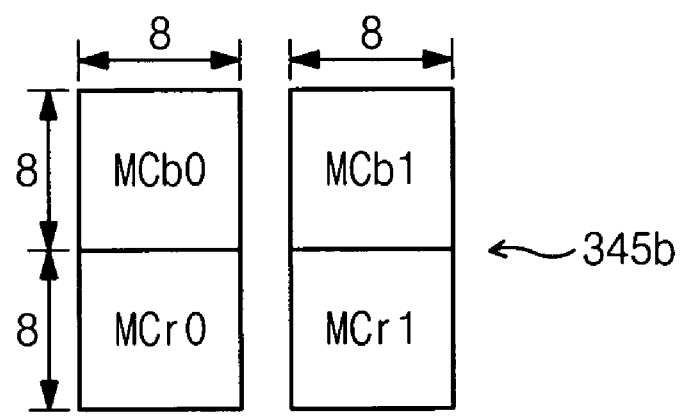

FIG. 5 illustrates an example of the composition of the quest-field memory, which may store luminance components, which may be provided from a previous frame reconstructed for the motion estimation and/or compensation. FIGS. 6A and 6B illustrate examples of the compositions of the reference macroblock luminance and/or chrominance memories, which may store luminance and/or chrominance components, which may be provided by a current frame input for the motion estimation and DCTQ. FIGS. 7A and 7B illustrate examples of the compositions of the motion-compensated luminance and/or chrominance memories, which may store motion-compensated luminance and/or chrominance components for the DCTQ coding/decoding and/or frame reconstruction.

Referring to FIG. 5, a quest-field memory 343 may store luminance components of a previous frame accessed with the burst lengths of 8 and/or 16 upon the external frame memory 291 of FIG. 2. The quest-field memory 343 may store 48×(16×10) pixels and/or data of 48×48 pixels may be required for the questing field of [−16, 16]. The pipelining operation may be performed with the burst lengths 8 and/or 16 for the frame memory. FIG. 5 shows an example of a configuration of the quest-field memory 343 which may store data of 48×(16×10) pixels.

The external frame memory 291 may be accessed with a burst length of 8 and two luminance blocks of 48×16 may be stored in blocks PY0 and PY1 of the quest-field memory 343. The frame memory 291 may be accessed with a burst length of 16 and two luminance blocks of 48×16 may be stored in the blocks PY0 and PY1 of the quest-field memory 343. Four luminance blocks of 48×16 may be stored in blocks PY2~PY5 of the quest-field memory 343 by accessing the frame memory with a burst length of 16. Four luminance blocks of 48×16 may be stored in blocks PY6~PY9 of the quest-field memory 343 by accessing the frame memory with a burst length of 16. The four luminance blocks of 48×16 may be stored in the blocks PY6~PY9 of the quest-field memory 343, and/or four luminance blocks of 48×16 may be stored in blocks PY0~PY3 of the quest-field memory 343. These processes may be repeated until the burst accessing operation may be completed in all, or substantially all, horizontal macroblocks of the previous frame. The number of macroblocks which may remain in the horizontal direction and a burst access may be performed for the remaining macroblocks. The sizes of vertical and horizontal pixels, for example, 48 pixels and 16×10 pixels, may be variable in corresponding to the range of the questing field.

Referring to FIGS. 6A and 6B, the reference macroblock memory 347 may include a reference macroblock luminance memory 347a which may store luminance components, and/or a reference macroblock chrominance memory 347b which may store chrominance components. The reference macroblock luminance memory 347a may access the frame memory 291 in the burst length 16 and may store the luminance components therein. The reference macroblock chrominance memory 347b may access the frame memory 291 in the burst length 8 and may store the chrominance components therein.

The luminance components data may be accessed with the burst length 16 in the unit of four macroblocks (each in size of 16×16 pixels), and may be stored in blocks CY0~CY3 of the reference macroblock luminance memory 347a. Four luminance macroblocks blocks may be stored in blocks CY4~CY7 of the reference macroblock luminance memory 347a. The luminance data may be accessed and stored in the luminance blocks CY4~CY7, and the data, which may have been previously stored in the luminance blocks CY0~CY3, may be processed. The four luminance macroblocks of 16×16 pixels may be stored in the blocks CY4~CY7 of the reference macroblock luminance memory 347a, and another four (for example, the next four) luminance macroblocks blocks may be stored in blocks CY0~CY3 of the reference macroblock luminance memory 347a. One memory block group (e.g., CY0~CY3) may be processed and another memory block group (e.g., CY4~CY7) may receive the luminance data for the next processing stage, and may enhance the performance of the pipelining operation. Processes are repeated until the burst accessing operation may be completed with all, or substantially all, of horizontal macroblocks of the previous frame. The burst access may be performed in corresponding to the number of macroblocks which may remain in a horizontal direction.

The chrominance components data may be accessed with a burst length of 8 in the unit of four macroblocks (of 8×8 pixels) in the sequence of Cb and Cr, and may be stored in blocks CCb0~CCb3 and CCr0~CCr3 of the reference macroblock chrominance memory 347b. The next chrominance components data may be accessed with a burst length of 8 in the unit of four macroblocks (each in size of 8×8 pixels) in the sequence of Cb and Cr, and may be stored in blocks CCb4~CCb7 and CCr4~CCr7 of the reference macroblock chrominance memory 347b. The data which may have been stored in the chrominance blocks CCb4~CCb7 and/or CCr4~CCr7 may be processed (for example, processed completely), and the chrominance data in the chrominance blocks CCb0~CCb3 and/or CCr0~CCr3 may be accessed and stored. One chrominance block group (e.g., CCb0~CCb3 and CCr0~CCr3) may be processed and the other chrominance block group (e.g., CCb4~CCb7 and CCr4~CCr7) may receive the chrominance data for the next processing stage, which may enhance the performance of a pipelining operation. Processes may be repeated and the burst accessing operation may be completed in all, or substantially all, of horizontal macroblocks of the previous frame.

Referring to FIGS. 7A and 7B, the motion-compensated memory 345 may store blocks of motion-compensated luminance and/or chrominance data. The DCTQ 301, the DCT 303, and the IDCT 309 may access the motion-compensated memory 345. The motion-compensated memory 345 may be comprised of a motion-compensated luminance memory 345a, which may store the same luminance components data which may be compensated in motion, and a motion-compensated chrominance memory 345b which may store the same, or substantially the same, chrominance components data which may be compensated in motion.

The motion-compensated luminance memory 345a may store at least two luminance macroblocks (each of which may be 16×16), and the motion-compensated chrominance memory 345b may store at least two chrominance macroblocks (each of which may be 8×8). The motion-compensated luminance memory 345a may be comprised of at least two luminance macroblocks, MY0 and MY1, which may be 16×16. The motion-compensated chrominance memory 345b may be comprised of at least chrominance macroblocks, MCb0, MCb1, MCr0, and MCr1, which may be 8×8.

Figure 8:
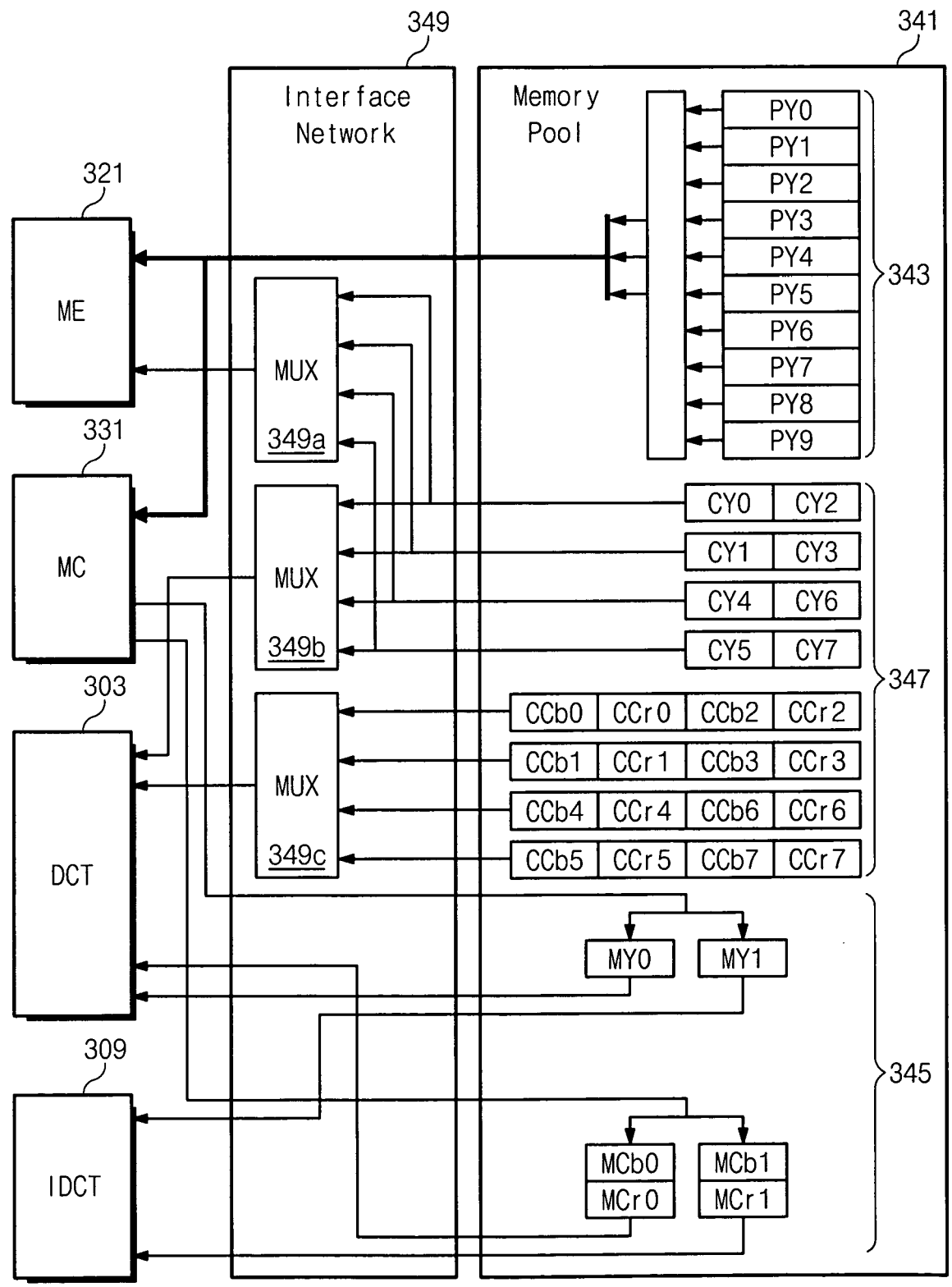
FIG. 8 is a block diagram illustrating examples of interrelation features between internal memories and data processing units through an interface network in an exemplary embodiment of the present invention.

FIG. 8 is a block diagram illustrating examples of interrelation features between the memory pool 341 of the internal memories and/or the data processing units through the interface network 349 according to the exemplary embodiments of the present invention. The DCT 303 and IDCT 309 may access the same, or substantially the same, motion-compensated macroblocks, and/or may share the motion-compensated memory 345. The motion estimator 321 and the motion compensator 331 may share the quest-field memory 343. The motion estimator 321 and the DCT 303 may share luminance blocks CY0~CY7 of the reference macroblock memory 347.

Luminance components data may be stored in the quest-field memory 343 and may be transferred to the motion estimator 321 and/or the motion compensator 331 in, for example, three blocks of 48×16. Pairs of luminance component macroblocks, which may be stored in the reference macroblock luminance memory 347, CY0/CY2, CY1/CY3, CY4/CY6, and CY5/CY7, may be provided to the motion estimator 321 and/or the DCT 303 by multiplexers (MUX) 349a and 349b. Groups of chrominance component macroblocks which may be stored in the reference macroblock chrominance memory 347, CCb0/CCr0/CCb2/CCr2, CCb1/CCr1/CCb3/CCr3, and/or CCb4/CCr4/CCb6/CCr6, CCb5/CCr5/CCb7/CCr7, may be provided to the DCT 303 by a multiplexer 349c.

A variable length coding operation may be performed by software and need not utilize the VLC. A motion vector and/or a quantizing coefficient (COEF) may be stored in the external frame memory for the VLC operation. The VLC may be employed in the VLC operation, and the motion vector and/or the quantizing coefficient need not be transferred.

Figure 9:
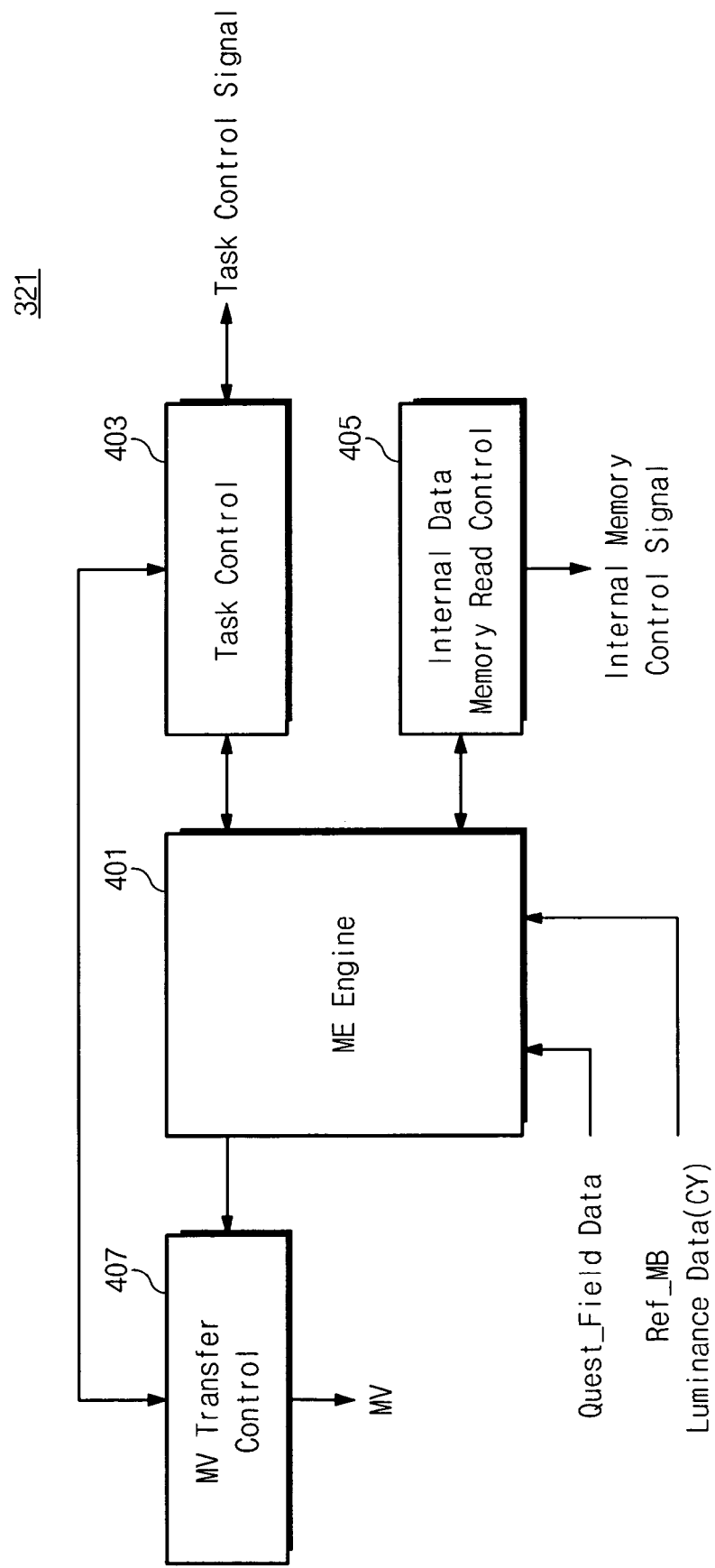
FIG. 9 is a block diagram schematically illustrating an exemplary embodiment of the motion estimator (ME) shown in FIGS. 2 and 3.
Figure 10:
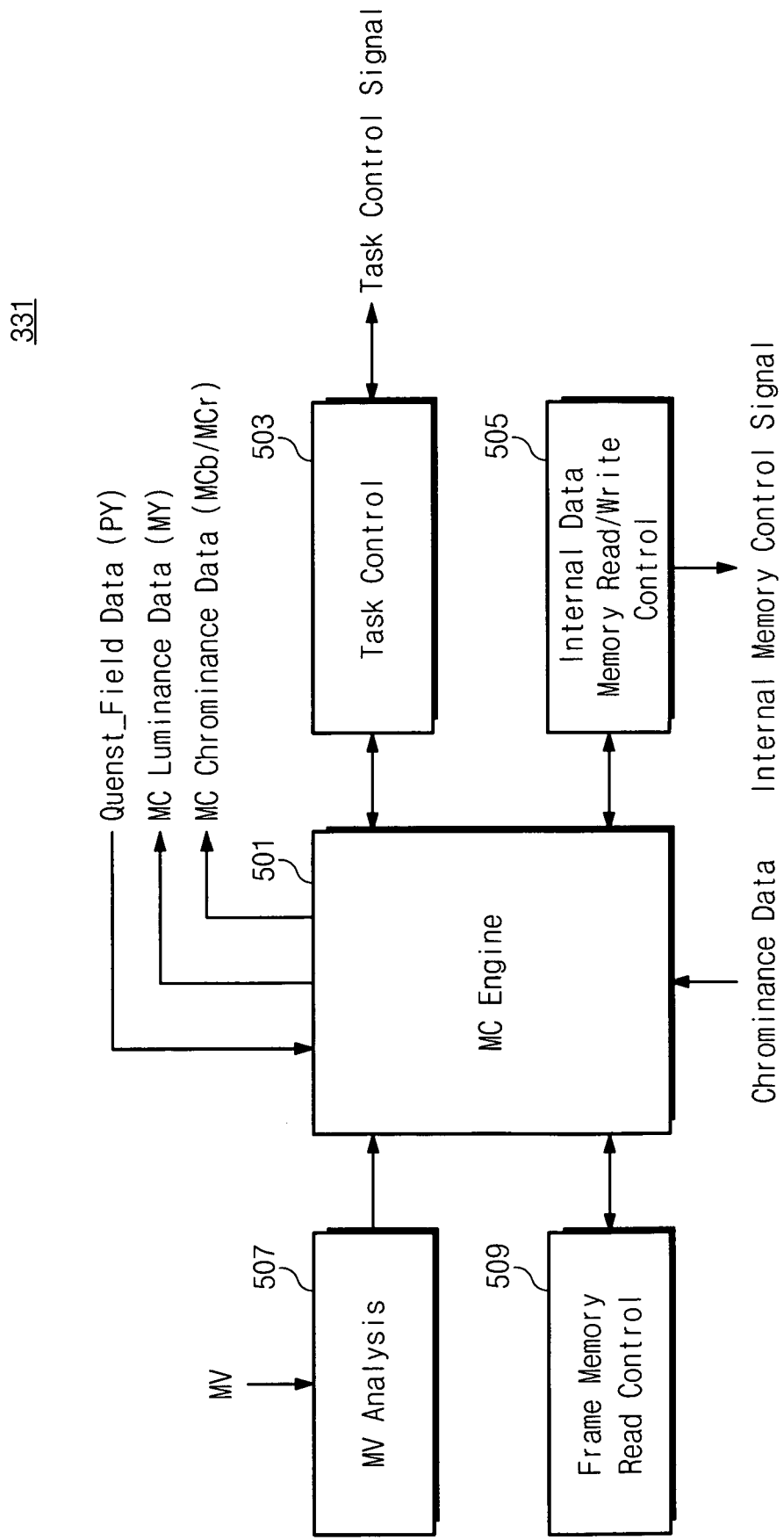
FIG. 10 is a block diagram schematically illustrating an exemplary embodiment of the motion compensator (MC) shown in FIGS. 2 and 3.
Figure 11:
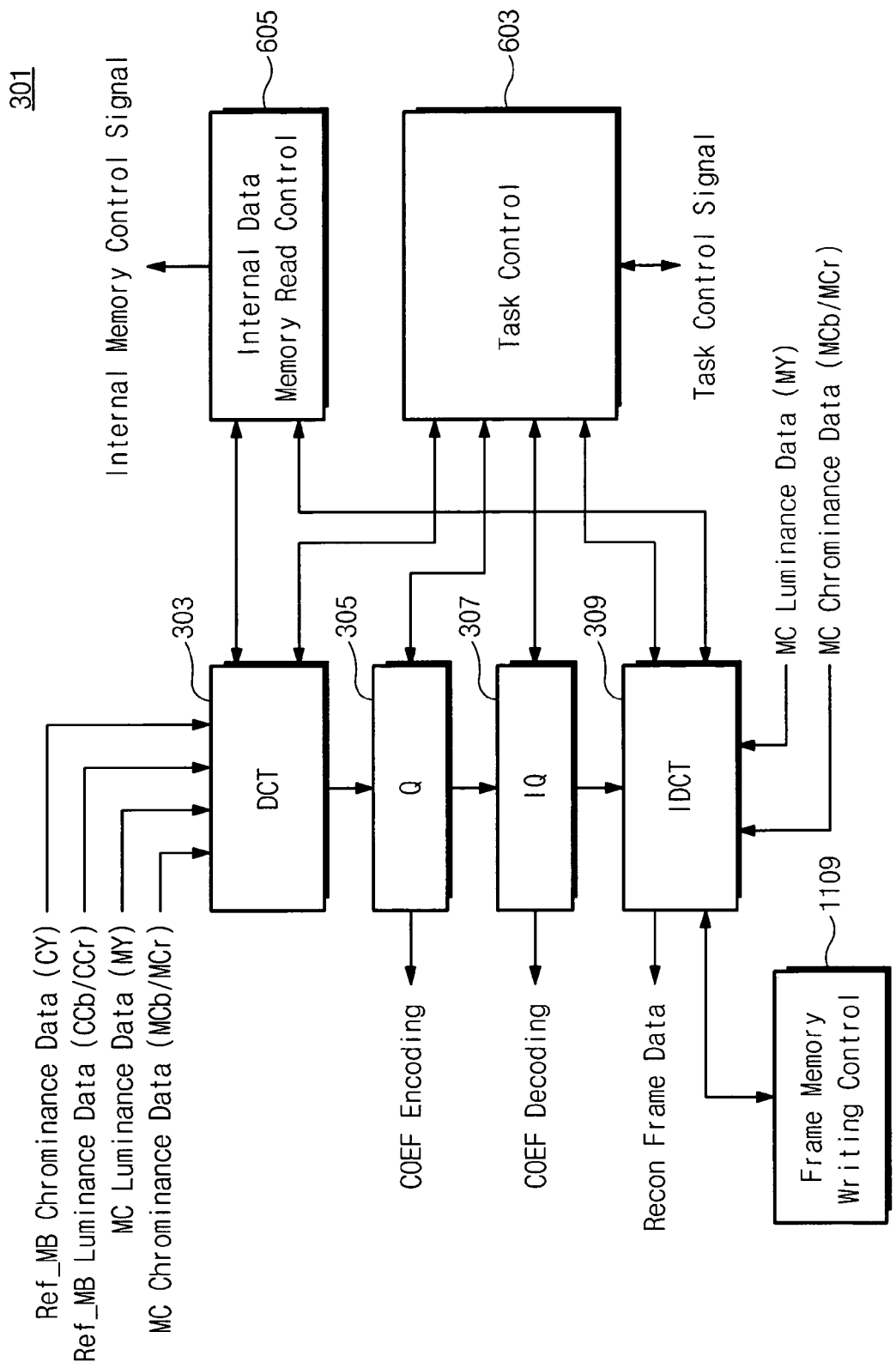
FIG. 11 is a block diagram schematically illustrating an exemplary embodiment of the discrete cosine transform quantizer (DCTQ) shown in FIGS. 2 and 3.
Figure 12:
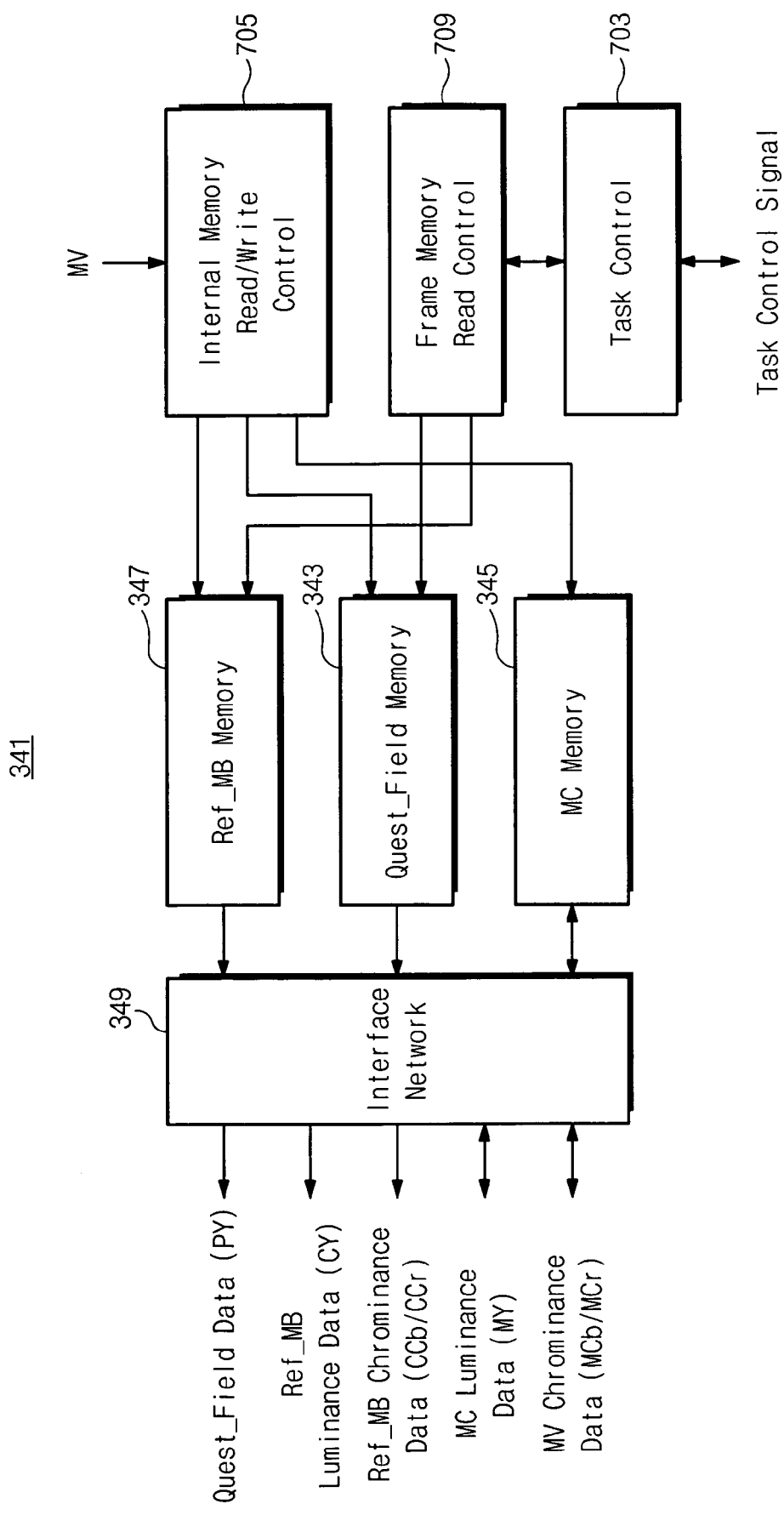
FIG. 12 is a block diagram schematically illustrating an exemplary embodiment of the memory pool shown in FIGS. 2 and 3.

FIG. 9 is a block diagram illustrating an exemplary embodiment of the motion estimator (ME). FIG. 10 is a block diagram illustrating an exemplary embodiment of the motion compensator (MC), and FIG. 11 is a block diagram illustrating an exemplary embodiment of the DCTQ. FIG. 12 is a block diagram illustrating an exemplary embodiment of the memory pool.

Referring to FIG. 9, the motion estimator 321 may be comprised of a motion-estimating engine 401, a task controller 403, an internal memory read controller 405, and a motion-vector transfer controller 407.

The task controller 403 may receive, and perform, a task command (i.e., a task control signal, for example, a motion-estimating start signal MEs and/or a motion-vector writing start signal MVw) from the task scheduler 361 and may transfer a task end signal (for example, a motion-estimating end signal MEe and/or a motion-vector writing end signal MVwe), which may communicate the completion of a task, to the task scheduler 361. A motion vector MV may be written into the external frame memory in response to the motion-vector writing start signal MVw under the control of the motion-vector transfer controller 407. A motion vector need not be stored in the external frame memory for the VLC operation, and the VLC may be able to use a motion vector by directly, or indirectly, accessing the motion estimator (the motion compensator may also access the motion estimator and may use a motion vector). The motion-vector need not write start signal MVw and the motion-vector need not write end signal MVwe. The motion-vector may enable the motion-vector by writing start signal MVw and may generate a writing end signal MVwe to inform the task scheduler 361 of completion of writing a motion vector.

The internal memory read controller 405 may generate an internal memory control signal for retrieving luminance data PY and/or luminance data CY from the quest-field memory 343 and/or the reference-macroblock memory 347 of the memory pool 341. The motion-estimating engine 401 may generate a motion vector MV by estimating a motion with the luminance data PY of the quest-field memory 343 and/or the luminance data CY of the reference-macroblock memory 347 in response to the motion-estimating start signal MEs. The motion-vector transfer controller 407 may store (for, example temporarily) the motion vector MV, may provide the motion vector MV to the motion compensator 331 (and/or the VLC), and/or may write the motion vector MV into the external frame memory for a motion-vector VLC operation.

The operations of estimating motion and/or writing the motion vector may be completed and the task controller 403 may send the motion-estimating end signal MEe and/or the motion-vector writing end signal MVwe to the task scheduler 361.

Referring to FIG. 10, the motion compensator 331 may be comprised of a motion-compensating engine 501, a task controller 503, an internal memory read/write controller 505, a motion-vector analyzing circuit 507, and a frame memory read controller 509.

The task controller 503 may receive, and perform, a task command (i.e., a task control signal, for example, a luminance motion-compensating start signal MCs[Y] and/or a chrominance motion-compensating start signal MCs[C]) from the task scheduler 361, and may transfer a task end signal (i.e., a luminance motion-compensating end signal MCe[Y] and/or a chrominance motion-compensating end signal MCe[C]), which may inform completion of a task, to the task scheduler 361. The internal memory read/write controller 505 may generate an internal memory control signal which may retrieve luminance data PY from the quest-field memory 343 and/or writing motion-compensated luminance data MY and/or motion-compensated chrominance data MCb/MCr in the motion-compensated memory 345. The frame memory read controller 509 may manage an access to the external frame memory (e.g., 291 shown in FIG. 2) for motion compensation of chrominance components. The motion-compensating engine 501 perform motion compensation for the luminance and/or chrominance components in response to the luminance and/or chrominance motion-compensating start signals, MCs[Y] and/or MCs[C], which may be supplied by the task scheduler 361, according to the analyzed motion vector. Motion compensation by the motion-compensating engine 501 may be completed and the task controller 503 may send luminance and/or chrominance motion-compensating end signals MCe[Y] and/or MCe[C] to the task scheduler 361.

Referring to FIG. 11, the DCTQ 301 may be comprised of the DCT 303, the quantizer (Q) 305, the inverse quantizer (IQ) 307, the IDCT 309, a task controller 603, an internal memory read controller 605, and a frame memory writing controller 609.

The task controller 603 may receive a task command, for example, a luminance DCTQ start signal DCTQs[Y], a chrominance DCTQ start signal DCTQs[C], a luminance COEF entropy-coding start signal COEFw[Y], a chrominance COEF entropy-coding start signal COEFw[C], a luminance inverse-quantizing/inverse-DCT start signal IQIDCTs[Y], a chrominance inverse-quantizing/inverse-DCT start signal IQIDCTs[C], and/or a reconstructed-frame storing start signal RECONw, and may apply a task end signal, for example, a luminance DCTQ end signal DCTQe[Y], a chrominance DCTQ end signal DCTQe[C], a luminance COEF entropy-coding end signal COEFwe[Y], a chrominance COEF entropy-coding end signal COEFwe[C], a luminance inverse-quantizing/inverse-DCT end signal IQIDCTe[Y], a chrominance inverse-quantizing/inverse-DCT end signal IQIDCTe[C], and/or a reconstructed-frame storing end signal RECONe, to the task scheduler 361.

The luminance and/or chrominance COEF entropy-coding start signals, COEFw[Y] and/or COEFw[C], may be provided to write the quantizing coefficients into the external frame memory 291 and may instruct an execution of the VLC operation.

The VLC 353 may directly, or indirectly, access the DCTQ 301 and may perform the VLC operation in response to the luminance and/or chrominance COEF entrophy-coding start signals COEFw[Y] and/or COEFw[C]. The DCTQ need not perform a writing operation to the external frame memory.

The internal memory read controller 605 may generate an internal memory control signal for reading luminance data CY from the reference-macroblock luminance memory, chrominance data CCb/CCr from the reference-macroblock chrominance memory, luminance data MY from the motion-compensated luminance memory, and/or chrominance data MCb/MCr from the motion-compensated chrominance memory. The frame memory writing controller 609 may manage the storing of a reconstructed frame in the external frame memory 291.

Referring to FIG. 12, the memory pool 341 may be comprised of the reference-macroblock memory 347 for storing luminance and/or chrominance components (and/or data) of a current frame, the quest-field memory 343 for storing luminance components of a precious frame, the motion-compensated memory 345 for storing motion-compensated luminance and/or chrominance components, a task controller 703, an internal memory read/write controller 705, a frame memory read controller 709, and the interface network 349.

The task controller 703 may receive a task command (a task control signal, for example, a quest-field luminance writing start signal PYw, a reference-macroblock luminance writing start signal CYw, and/or a reference-macroblock chrominance writing start signal CCBRw) and may store data in the external frame memory, for example, through the frame memory read controller 709, into the reference-macroblock luminance and/or chrominance memories and/or the quest-field memory 343. The task controller 703 may send a task end signal, for example, a task control signal such as a quest-field luminance writing end signal PYwe, a reference-macroblock luminance writing end signal CYwe, and/or a reference-macroblock chrominance writing end signal CCBRwe.

The internal memory read/write controller 705 may receive internal memory control signals from the data processing units and may provide the data processing units with the quest-field luminance data PY, the reference-macroblock luminance data CY, the reference-macroblock chrominance data CCb/CCr, the motion-compensated luminance data MY, and/or the motion-compensated chrominance data MCb/MCr through the interface network 349.

Figure 13:
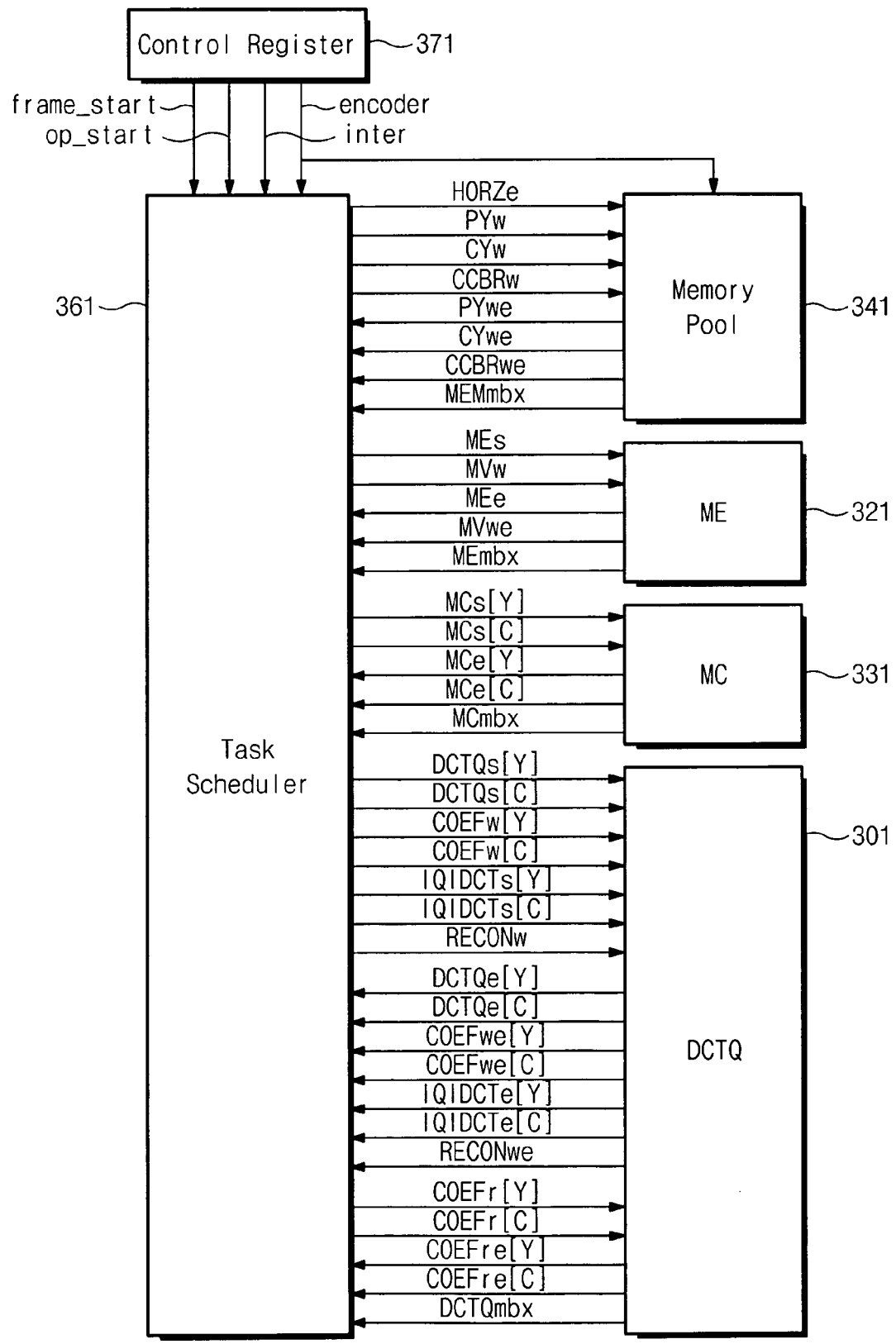
FIG. 13 illustrates an example of the interconnection feature of signals which may be exchanged between the task scheduler and the data processing units.

FIG. 13 illustrates an example of an interconnection feature between the task scheduler and the data processing units with the task start and end signals. The task scheduler 361 may begin operation in response to a frame start signal Fs, applied from the control register 371, which may indicate a beginning of a frame. The control register 371 may provide mode set signals (for example, an encoding signal EN differentiating encoding and decoding operation modes and an inter-mode signal IT differentiating inter- and intra-modes) to the task scheduler 361 which may establish functions of the video codec. The encoding signal EN may be "1" or "0" and the encoding operation mode may be conductible. The inter-mode signal IT may be "1" or "0" and the inter-mode IT may be conductible. The video encoding operation mode may be carried out with the unit of frame and/or slice. The encoding operation with the unit of slice may be carried out by a number of macroblocks and the control register 371 may generate an operation start signal Ops which may inform an operation for the next slice. Signals MEMmbx, MEmbx, MCmbx, and/or DCTQmbx may represent horizontal positions of macroblocks currently processed in the memory pool 341, the motion estimator 321, the motion compensator 331, and/or the DCTQ 301. The signal MEMmbx may be incremented by 4 and the macroblocks may be stored in the internal memory by a unit of 4. The signals MEmbx, MCmbx, and/or DCTQmbx may be incremented by 1 whenever operations of motion-vector transfer, motion compensation for chrominance components, and/or DCTQ task for chrominance components may end.

The video codec may be associated with VGA resolution and 6 bits may represent a horizontal position of a macroblock. Horizontal macroblocks may be divided into 4 macroblocks and the last macroblock may be one of 0, 1, 2, and 3. A signal HORZe may denote the number of remaining macroblocks. The signal HORZe may be generated and macroblocks which may correspond to the remaining macroblocks may be stored in the memory of the memory pool. The last two bits among the bits, which may represent the horizontal position, may denote the number of the remaining macroblocks.

The rest signals shown in FIG. 13 may be task start signals, which may inform at least one of the data processing units (321, 331, 301) and/or the memory pool 341, of a task beginning, and task end signals which may inform at least one of the data processing units (321, 331, 301) and/or the memory pool 341 of a task end.

PYw may be generated from the task scheduler 361 and may inform the memory pool 341 of a writing start with the quest-field luminance data PY0~PY9. PYwe may be generated from the memory pool 341 and may inform the task scheduler 361 of a writing end with the quest-field luminance data PY0~PY9. CYw may be generated from the task scheduler 361 and may inform the memory pool 341 of a writing start with the reference-macroblock luminance data CY0~CY7. CYwe may be generated from the memory pool 341 and may inform the task scheduler 361 of a writing end with the reference-macroblock luminance data CY0~CY9. CCBRw may be generated from the task scheduler 361 and may inform the memory pool 341 of a writing start with the reference-macroblock chrominance data CCb0~CCb7 and/or CCr0~CCr7. CCBRwe may be generated from the memory pool 341 and may inform the task scheduler 361 of a writing end with the reference-macroblock chrominance data CCb0~CCb7 and/or CCr0~CCr7.

MEs may be generated from the task scheduler 361 and may start a motion-estimating operation in the motion estimator 321. MEe may be generated from the motion estimator 321 and may inform the task scheduler 361 of an end of the motion-estimating operation. MVw may be generated from the task scheduler 361 and may enable the motion estimator 321 to write a motion vector MV, which may be obtained from the motion-estimating operation, in the external frame memory 291. MVwe may be generated from the motion estimator 321 and may inform the task scheduler 361 of a writing end with the motion vector MV.

MCs[Y] may be generated from the task scheduler 361 and may enable the motion compensator 331 to start a motion-compensating operation for luminance data. MCs[C] may be generated from the task scheduler 361 and may enable the motion compensator 331 to start a motion-compensating operation for chrominance data. MCe[Y] and/or MCe[C] may be generated from the motion compensator 331 and may inform the task scheduler 361 of writing ends of the motion-compensating operations for the luminance and/or chrominance data.

DCTQs[Y] and/or DCTQs[C] may be generated from the task scheduler 361 and may enable the DCTQ 301 to perform a DCTQ operation which may include DCT, quantization, inverse-quantization, and/or IDCT, corresponding to luminance and/or chrominance data. DCTQe[Y] and/or DCTQe

[C] may be generated from the DCTQ 301 and may inform the task scheduler 361 of an end of the DCTQ operation. COEFw[Y] and/or COEFw[C] may be generated from the task scheduler 361 and may enable the DCTQ 301 to perform entrophy-coding operations for quantizing coefficients corresponding to luminance and/or chrominance data, which may be obtained from the quantizing operation. COEFwe[Y] and/or COEFwe[C] may be generated from the DCTQ 301 and may inform the task scheduler 361 of an end of the entrophy-coding operations of the quantizing coefficients respective to the luminance and/or chrominance data.

The VLC may be utilized and the signals COEFw[Y] and/or COEFw[C] may enable the VLC to perform a VLC operation with a quantizing coefficient which may be stored in the quantizing-coefficient memory 213 of FIG. 2, corresponding to luminance and/or chrominance data. The signals COEFwe[Y] and/or COEFwe[C] may be generated from the DCTQ 301 and may inform the task scheduler 361 of an end of the VLC operations corresponding to the luminance and/or chrominance data. RECONw may enable the DCTQ 301 to store reconstructed frame data. The storing operation may be competed with the reconstructed frame data and the DCTQ 301 may generate a signal RECONwe and may inform the task scheduler 361 of an end of task.

The task scheduler 361 may generate signals COEFr[Y] and/or COEFr[C] which may instruct the DCTQ 301 to read (or retrieve) quantizing coefficients about luminance and/or chrominance data from the external frame memory (or the VLC). The DCTQ 301 may generate signals COEFre[Y] and/or COEFre[C] which may inform the task scheduler 361 of an end of the read operations corresponding to the luminance and/or chrominance data. The task scheduler 361 may also generate IQIDCTs[Y] and/or IQIDCTs[C] and may instruct the DCTQ 301 to perform IQ/IDCT operations for luminance and/or chrominance data. The DCTQ 301 may generate signals IQIDCTe[Y] and/or IQIDCTe[C] which may inform the task scheduler 361 of an end of the IQ/IDCT operations corresponding to the luminance and/or chrominance data.

FIGS. 14A and 14B illustrate examples of features of pipeline operations in an inter-coding mode and an intra-coding mode, while FIGS. 15A and 15B illustrate examples of features of pipeline operations in an inter-decoding mode and an intra-decoding mode.

Referring to FIG. 14A, luminance data for motion estimation may be transferred to the quest-field memory (e.g., 243 of FIG. 2) and/or the reference-macroblock memory (e.g., 247) from the external frame memory (e.g., 281). The data storage process from the external frame memory to the memory pool (e.g., 241 of FIG. 2) may be repeated in the sequence of the quest-field memory, the reference-macroblock luminance memory, and/or the reference-macroblock chrominance memory. During T0, 6 luminance blocks of 48×16 may be stored in blocks PY0~PY6 of the quest-field memory (243 or 343). T0 may be accomplished by accessing the frame memory 291, for example, at least twice. The frame memory 291 may be accessed with a burst length of 8 and may store luminance data in the memory blocks PY0 and/or PY1. The frame memory 291 may be accessed with a burst length of 16 and may store luminance data in the memory blocks PY2~PY5.

In T1, the frame memory 281 of FIG. 2 may be accessed with a burst length of 16 and may store at least 4 luminance data of 16×16 in the blocks CY0~CY3 of the reference-macroblock luminance memory.

The storing operation may be completed with the at least 4 luminance macroblocks in the reference-macroblock luminance memory and the motion estimator (231 or 331) may perform motion estimation for the at least 4 luminance blocks CY0~CY3 which may be stored in the reference-macroblock luminance memory in a macroblock of 16×16. As shown in FIG. 14A, in T2, the motion estimator may perform motion estimation with the quest-field luminance data PY0~PY2 and/or the reference-macroblock luminance block CY0 may be prepared by T0 and T1. In T2, the frame memory 281 may be accessed with a burst length 8 and may store at least 4 chrominance data of 8×8, in the blocks CCb0~CCb3 and/or CCr0~CCr3. The motion estimation may end in T2 and MEMmbx may transition from, for example, 0 to 4.

A motion vector may be generated from the motion estimation for the luminance macroblock CY0 in T2, the motion vector may be transferred to the external frame memory 291 and the motion compensator (231 or 331) may carry out motion compensation for the luminance macroblock in T3. The motion-compensated luminance macroblock may be stored in the motion-compensated luminance memory. The transfer operation of the motion vector may be ended and MEmbx may increment from, for example, 0 to 1. The frame memory 281 may be accessed with a burst length of 8 in T2, the chrominance data CCb0~CCb3 and CCt0~CCr3 may be stored in the reference-macroblock chrominance memory, and the frame memory 281 may be accessed with a burst length of 16 which may start the storing of at least 4 luminance blocks PY6~PY9, each of 48×16 pixels, in the quest-field memory which may perform a motion-estimating operation for the luminance macroblock CY4 in T8 (the third one in FIG. 14A). In T9, the frame memory 281 may be accessed with a burst length of 16 which may start the storing of at least 4 luminance blocks CY4~CY7, each of 16×16 pixels, in the reference-macroblock memory (refer to FIG. 5).

Motion compensation for the luminance blocks and/or the transfer of the motion vector may be completed and the DCTQ (201 or 301) may perform a DCTQ process (DCT, Q, IQ, and IDCT) for a differential luminance block CY0-PY0 in the unit of 8×8 blocks in T4. The task T4 may also compensate variation of motion for the chrominance block and may begin a motion-estimating operation for the luminance macroblock CY1. The motion compensation for the luminance data may be completed and MCmbx may increment from, for example, 0 to 1.

The DCTQ process for the differential luminance block CY0-PY0 may be performed and the DCTQ may perform a VLC process for luminance data COEFY0 throughout T5 and T6₁. Motion compensation for the luminance block in T4 may be completed and a DCTQ process for luminance data may be performed in T5. Motion estimation for a luminance macroblock may be completed in T5 and T6 and estimation may be performed for the luminance macroblock and may be stored in the motion-compensated luminance memory.

The DCTQ process for the luminance block in T5 may be completed and task T6 may write a reconstructed frame. T6 may be ended and DCTQmbx may increment from, for example, 0 to 1.

The VLC operation for the luminance data COEFY0 in T6 may be completed and task T8₁ may perform a VLC process for luminance data. The motion estimator (221 and/or 321), the DCTQ (201 and/or 301), and/or the motion compensator (231 or 331) may perform operations of motion estimation for chrominance data, DCTQ for differential luminance data CY1-PY1, and/or motion compensation for the luminance data CY2.

Quest-field data, luminance data of the reference macroblocks, and/or chrominance data may be stored in the external frame memory 291 during T0 and T3~T8 (T3, T4, T4, T6, T8, T9, T6, T8), T1 and T9, and/or T2 and T9. Operations of motion estimation may be performed in T2, T4~T5, T8, and/or T9, and motion vectors may be transferred in T3 and T6. Motion-compensated luminance data, motion-compensated chrominance data, luminance data of DCTQ, chrominance data of DCTQ, and/or reconstructed frames may be stored during T3 and T6, the tasks T4 and T8, the tasks T4 and T8, the tasks T5 and T9, and/or the task T6.

A VLC operation for luminance data may be performed during T5, T6, and T9~T6 and a VLC operation for chrominance may be performed in T8.

The intra-coding mode need not be associated with access to quest-field data, the motion estimator, and/or the motion compensator and T0 and T3 may be the same, or substantially the same, as those in the inter-coding mode.

Referring to FIG. 15A, the inter-decoding mode need not perform motion estimation and/or need not be operative with the reference macroblocks, relative to the inter-coding mode. The motion estimator need not be conductive in the inter-decoding mode, such that quest-field data may be accessed during T0 and/or T3~T6 (T3, T4, T5, T6, T7. T8. T9, T6, T7, T8, T9, and T6). Motion-compensated luminance data, motion-compensated chrominance data, luminance data of DCTQ, chrominance data of DCTQ, and/or reconstructed frames may be stored during T3 and T6, T4 and T7~T8, T4 and T8, T5 and T9, and/or T6.

Referring to FIG. 15B, the intra-decoding mode may be the same, or substantially the same, as the inter-decoding mode, and need not include motion compensation.

Figure 16C:
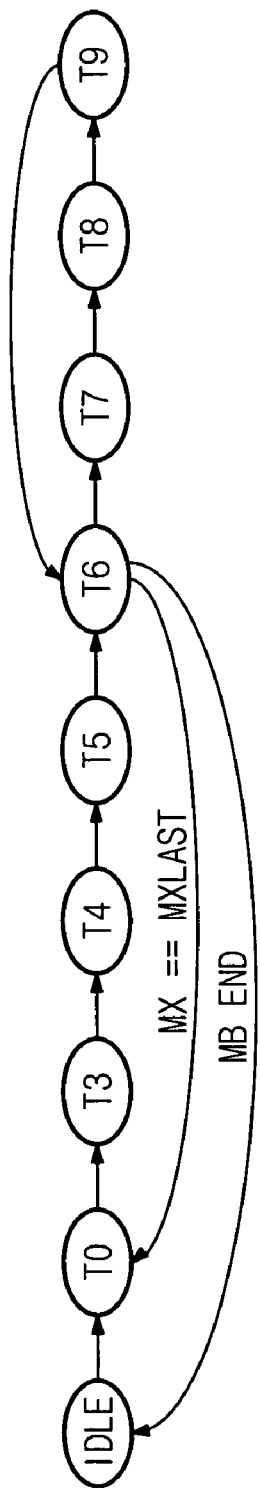

FIGS. 16A through 16D are processing diagrams illustrating examples of task flows in pipeline operations as illustrated in FIGS. 14A, 14B, 15A, and 15B. FIGS. 16A, 16B, 16C, and/or 16D may correspond to the inter-coding mode, the intra-coding mode, the inter-decoding mode, and/or the intra-decoding mode.

Operations for all macroblocks on horizontal direction may be completed in T8 and/or T6 (for example, MX=MXLAST; MX may represent a horizontal position of a macroblock which may be processed at present and MXLAST may represent a position of the last horizontal macroblock), may return to an initial task. An operation for one frame may be terminated (MB END) and an idle task (IDLE) may be performed.

FIGS. 17 through 20 are transitional diagrams of examples of the task scheduler in an inter-encoding mode, an intra-encoding mode, an inter-decoding mode, and/or an intra-decoding mode, each may correspond to a pipeline sequence or sequences shown in FIGS. 14A through 15B.

In FIGS. 17-20, maxlast (i.e., MXLAST in the preceding description) may denote a position of the last macroblock in the horizontal direction, which may have a value of M−1 (M may be the number of macroblocks in the horizontal direction). mx may denote a horizontal position of a macroblock which may be conductive, and may represent the same, or substantially the same, position as dctq_mbx (i.e., DCTQmbx). my may denote a vertical position of a macroblock, and may be established in the range of 0~N−1 (N may be the number of macroblocks in the vertical direction). op_unit may be represent the total number of the macroblocks, i.e., M×N, and op_cnt may represent the number of macroblocks which may be presently processed.

Figure 17:
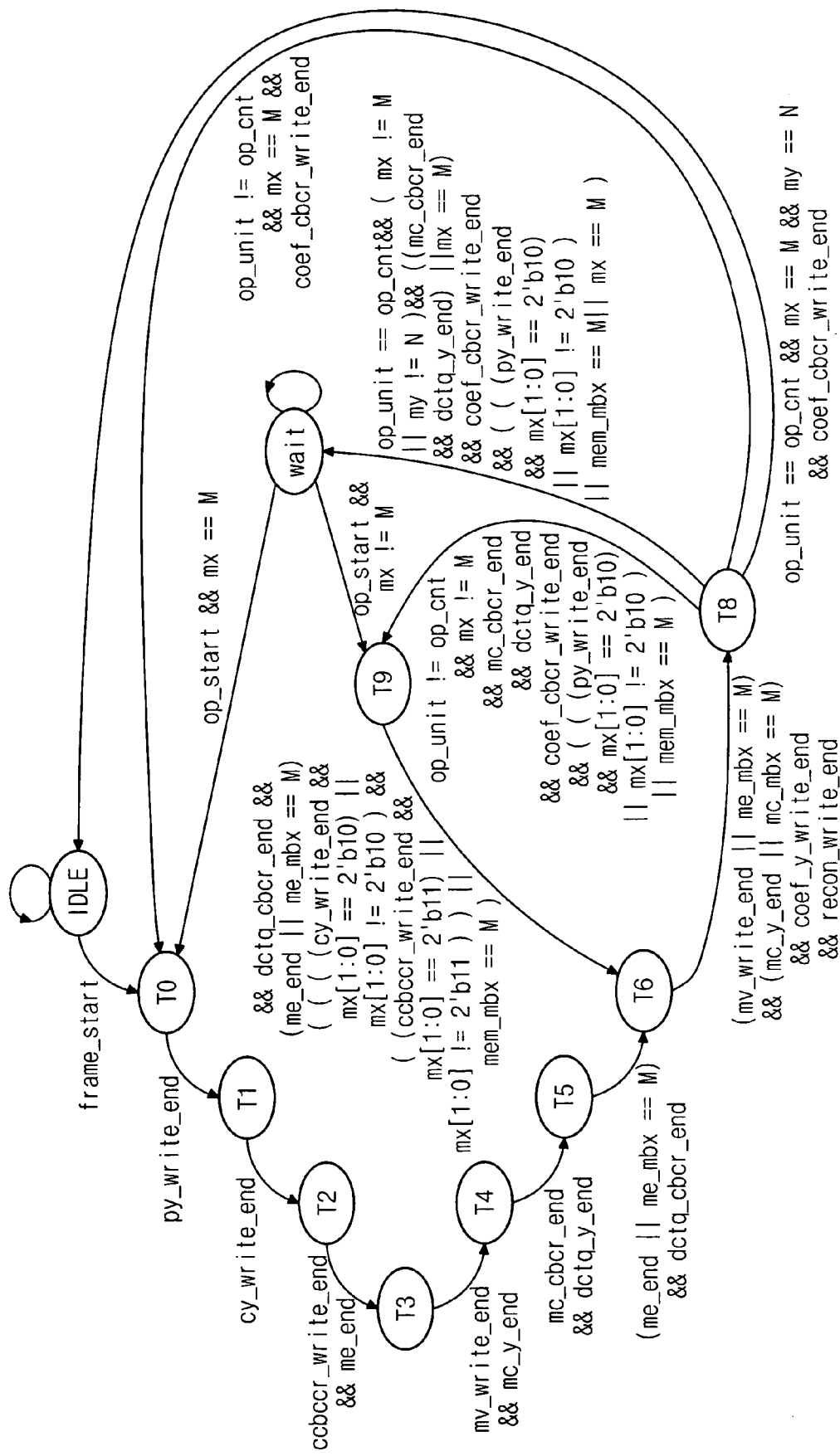
FIGS. 17 through 20 are examples of transitional diagrams of examples of the task scheduler respectively in the inter-encoding mode, the intra-encoding mode, the inter-decoding mode, and/or the intra-decoding mode.

Referring to FIG. 17 the task scheduler may begin operation for at least one frame in response to a frame start signal frame_start (i.e., Fs) of the control register and may convert tasks (for example, state transition) through the task end signals which may be provided from the memory pool, the motion estimator, the motion compensator, and/or the DCTQ.

A task state may be transitioned to T0 from an idle state IDLE by a frame start signal frame_start of the control register. The memory pool may generate the quest-field macroblock luminance data writing-end signal py_write_end (i.e., PYwe) and the task scheduler may alter to T1. The memory pool may generate the reference-macroblock luminance data writing-end signal cy_write_end (i.e., CYwe) and the state may be transitioned to T2. The reference-macroblock chrominance data writing-end signal ccbr_write_end (i.e., CCBRwe) and/or the motion-compensating end signal me_end (i.e., MEe) may be generated and the state may be transitioned to T3. A writing operation of a motion vector into the external frame memory (mv_write_end; i.e., MVwe) and/or terminating motion compensation for luminance data (mc_y_end; i.e., MCe[Y]) may be completed and the state may be transitioned to T4. Motion compensation for chrominance data (mc_cb_cr_end; i.e., MCe[C]) and/or a DCTQ task for luminance data (dctq_y_end; i.e., DCTQe[Y]) may be completed and the state may proceed to T5. Signals which may enable a transition from T5 to T6 may be the motion-estimating end signal me_end (i.e., MEe) and/or the chrominance-data DCTQ end signal dctq_chcr_end (i.e., DCTQe[Y]). The last macroblock on the horizontal direction (me_mbx=M−1) may be processed in operations of motion estimation, motion compensation, and/or DCTQ, (for example, in sequence). The motion estimation for the last macroblock may be ended, the motion vector may be transferred, and the last macroblock on the horizontal direction may become me_mbx=M. The motion-estimating end signal need not be generated when the DCTQ operation for chrominance data may be ended (dctq_cb_cr_end) and the state may not transition to T6 from T5. To condition the transition from T5 to T6 for the last macroblock by the signal dctq_cbcr_end of the signal me_end, the logical formula me_mbx==M, may be logically summed with me_end (me_end||me_mbx==M).

Signals which may enable the transition of the state from T6 to T5 may be the motion-vector transfer end signal mv_write_end (i.e., MVwe), the luminance motion-compensating end signal mc_y_end (i.e., MCe[Y]), the reconstructed-frame writing end signal recon_write_end (i.e., RECONwe), and/or the chrominance VLC end signal coef_y_write_end (COEFwe[Y]) (refer to FIG. 14A). The motion-vector transfer end signal and/or the luminance motion-compensating end signal need not be generated when the VLC end signal for the last macroblock on the horizontal direction may be active, the last macroblock may use the logical formula mv_write_end||me_mbx==M, mc_y_end||mc_mbx=M.

In T8, processing macroblocks in the horizontal direction need not be completed prior to finishing the process for the whole frames and the state may transition from, for example, T8→T9→T6→T8. The number of macroblocks which may have been processed until now may be equal to the number of the entire macroblocks (op_unit=op_cnt) if: a horizontal position of a current macroblock may be equal to M (i.e., the number of macroblocks on the horizontal direction) (mx==M), a vertical position of a current macroblock may be equal to the number of macroblocks on the vertical direction (my==N), and/or if a VLC operation for a luminance quantizing coefficient may be completed (coef_cbcr_write_end; i.e., COEFwe[c]), i.e., when the process for one frame as a whole may be terminated, the state may go to the idle state IDLE from T8 to wait for a process against a new frame. The number of macroblocks which may have been processed may be less than the number of the entire macroblocks (op_unit!=op_cnt; i.e., the process for one frame as a whole may not have been terminated); if a VLC operation for a luminance quantizing coefficient may be completed (coef_cbcr_write_end; i.e., COEFwe[c]), and/or the last horizontal macroblock may have been processed (mx==M). The state may go to T0 and may perform operations for a macroblock on the next horizontal line.

The process for the whole macroblocks may not be terminated, due to an incomplete process for macroblocks on the horizontal line (op_unit!=unit && mx!=M), and the state may transition to T9 from T8. Operations of motion compensation for chrominance data (mc_cbcr_end; i.e., MCe[Y]), DCTQ for luminance data (dctq_y_end; i.e., DCTQe[Y]), and/or VLC for a quantizing coefficient of chrominance data (coef_cbcr_write_end; i.e., COEFwe[C]) may be completed in T8 of FIG. 14A and the state may go to T9. During transition from $T8_1$ to T9, the writing end signal for the luminance macroblock PY, py_write_end (i.e., PYwe) as well as the signals mc_cbcr_end, dctq_y_end, and/or coef_cbcr_write_end may also be performed.

Motion compensation for chrominance data (mc_cbcr_end) may be completed in T8 and the state may be set on mx[1:0]=1 (the lower two bits of mx is '01'). Motion compensation for chrominance data (mc_cbcr_end) may be completed in the second T8 and the state may be set on mx[1:0]=1 (the lower two bits of mx is '10'). The transition from T8 to T9 may be added of the logical formula (((py_write_end) && mx[1:0]==2'b10)||mx[1:0]!=2'10)||mem_mbx==M).

As shown in FIG. 14A, the motion estimation (me_end; i.e., MEe) and/or the DCTQ operation for chrominance data (dctq_cbcr_end; i.e., DCTQe[Y]) may be completed and T9 may transition to T6. In transition from T9 to T6, a writing operation for the reference-macroblock luminance data may be completed (cy_write_end), as well as me_end and/or dctq_cbcr_end. Transition from $T9_3$ to T6, a writing operation for the reference-macroblock chrominance data may be completed (ccbccr_write_end; i.e., CCBRwe). T9 may be ended and the state may result in mx[1:0]=3. The transition from T9 to T6 may be accomplished when the logical condition (me_end||me_mbx && dctq_cbcr_end && ((((cy_write_end && mx[1:0]==2'b10)||mx[1:0]!=2'b10 && ((ccbccr_write_end && mx[1:0]==2'b11||mx[1:0]!=2'b11|| mem_mbx==M) may be satisfied.

T8 may go to a standby state WAIT and may assist with processing a macroblock in the unit of slice. The process in the unit of slice which may have been established at T2 may have been completed (op_unit=op_cnt) but the entire frame may not have been completely processed (mx!=M||my!=N) and T8 may go to the standby state WAIT. In transition from T8 to T9, the logical condition may be (((py_write_end) && mx[1:0]==2b10)||mx[1:0]!=210||mem_mbx==M||mx==M) which may assure the all, or substantially all, transitions from T8 to the standby state WAIT. All, or substantially all, transitions from T8 to the standby state WAIT may be accomplished by satisfying the logical condition op_unit==op_cnt && (mx!=M||my!=N) && ((mc_cbcr_end && dctq_y_end)||mx==M) && coef_cbcr_write_end && (((py_write_end) && mx[1:0]==2'b10)||mx[1:0]!=2'b10||mem_mbx==M||mx==M).

In the standby state WAIT, the operation start signal op_start (i.e., OPs; or referred to as a sliced-processing start signal) may be generated from the control register and/or the process for all the macroblocks on the horizontal direction (or line) may end (mx==M) and the state may go to T0. The process for all, or substantially all, the macroblocks in the horizontal direction may not have been completed (mx!=M), the sliced-processing start signal op_start may be enabled by the control register, and the state may transition to T9 from the standby state WAIT.

Figure 18:
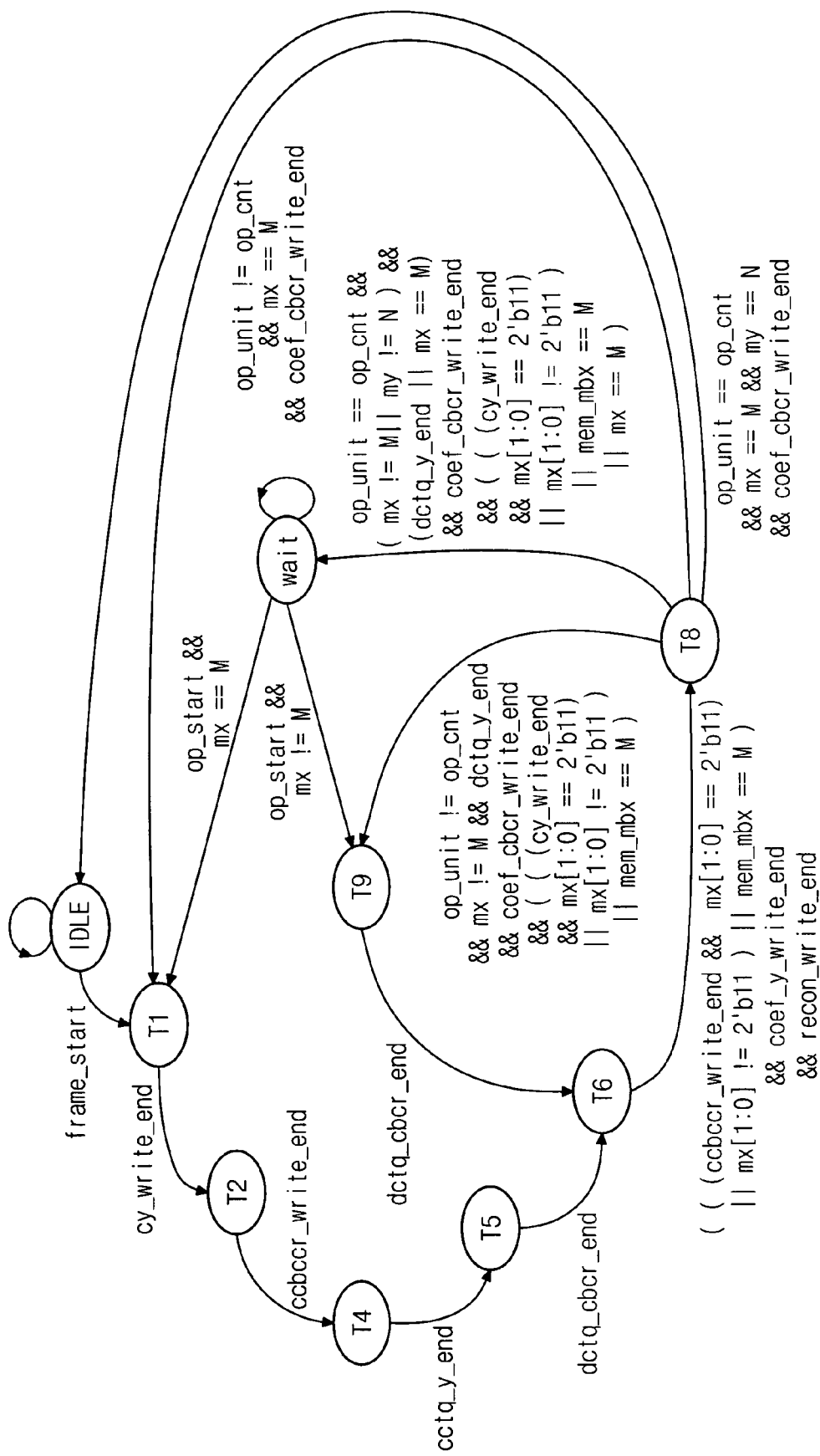

Referring to FIGS. 18, 14A, and 16B, the state may transition from an idle state IDLE to T1 by the signal frame_start (i.e., Fs) of the control register. T1 may go to T2 in response to the signal cy_write_end (i.e., CYwe). T2 may go to T4 in response to the signal ccbccr_write_end (i.e., CCBRwe). T4 may go to T5 in response to the signal dctq_y_end (i.e., DCTQe[Y]). T5 may transition to T6 in response to the signal dctq_cbcr_end (i.e., DCTQe[C]). The state may transition from T6 to T8, when the condition (((ccbccr_write_end && mx[1:0]==2'b11)||mx[1:0]!=2b'11||mem_mbx==M) may be satisfied according to a writing operation for the reference-macroblock chrominance data, after completing motion compensation for luminance data (mc_y_end||mc_mbx==M), a VLC operation for a quantizing coefficient of luminance data (coef_y_write_end), and/or storage of a reconstructed frame (recon_write_end). Operational features of transitioning to the idle state IDLE and/or the task T1 may be the same, or substantially the same, as shown in FIG. 17. The intra-coding mode may not perform motion compensation and a motion-compensating end signal mc_cbcr_end (i.e., MCe[C]) need not be performed for chrominance data during the transition from T8 to the standby state WAIT, using the signal cy_write_end (i.e., CYwe) instead of the signal py_write_end (i.e., PYwe). T8 may end and the state may be conditioned on mx[1:0]=3, such that the condition mx[1:0]==2'b10 of the inter-coding mode shown in FIG. 17 may change to mx[1:0]==2'b11.

Figure 19:
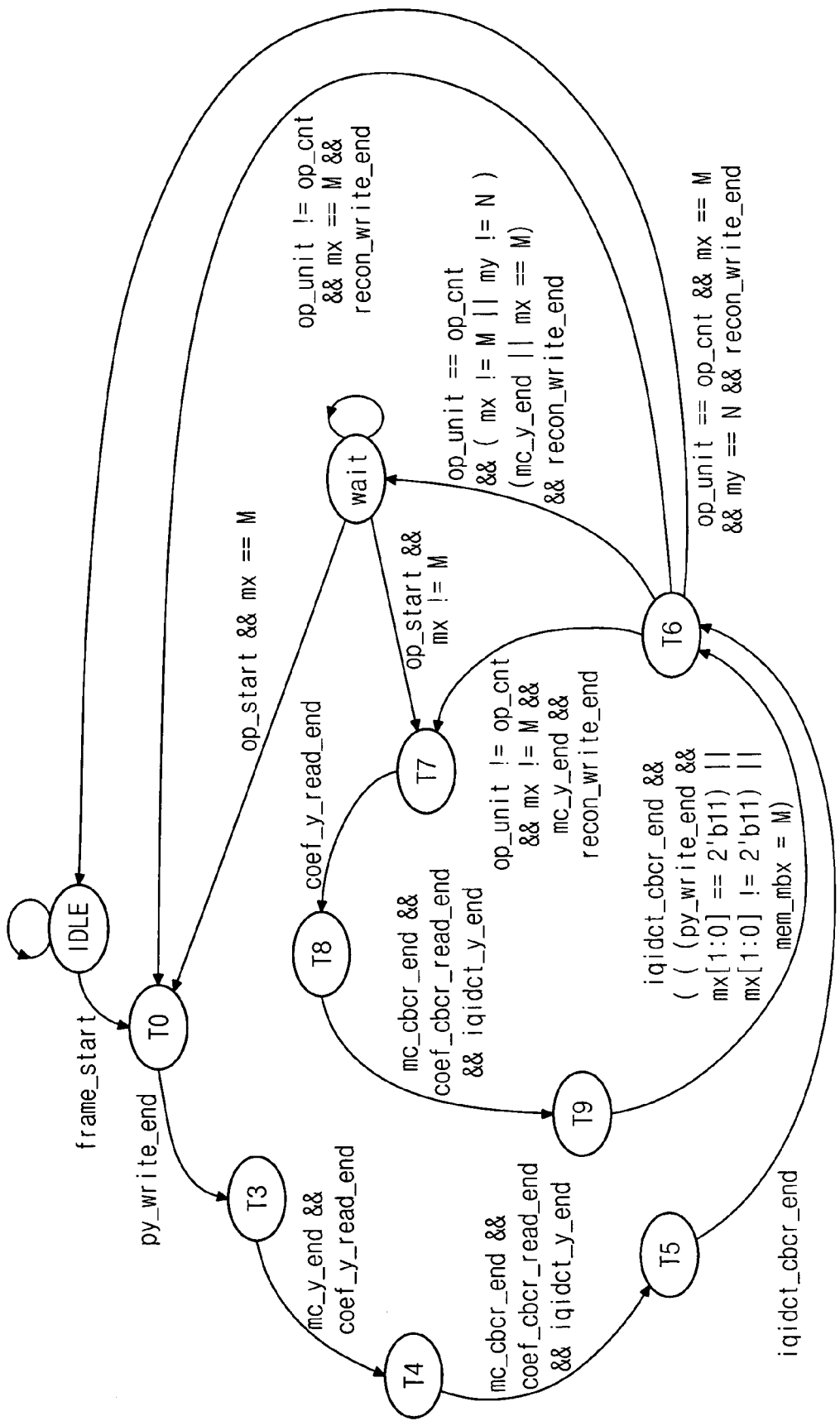

FIG. 19 illustrates an example of features of state transitions by the task scheduler in an inter-decoding mode. Referring to FIGS. 19, 15A, and 16C, the state may transition from an idle state IDLE to T0 in response to the signal frame_start (i.e., Fs) of the control register. T0 may go to T3 in response to the signal py_write_end (i.e., PYwe) when a writing operation for luminance data may be completed. T3 may go to T4 in response to the signal mc_y_end (i.e., MCe[Y]; after motion-compensating for luminance data) and/or the signal coef_y_read_end (i.e., COEFre[Y]; after reading a luminance quantizing coefficient from the external memory or the VLC). T4 may go to T5 in response to the signal mc_cbcr_end (i.e., MCe[C]; after motion-compensating for chrominance data), the signal coef_cbcr_read_end (i.e., COEFre[C]; after reading a chrominance quantizing coefficient from the external memory or the VLC), and/or the signal iqidct_y_end (i.e., IQIDCTe[Y]; after completing an IQIDCT operation for luminance data). T5 may transition to T6 in response to the signal iqidct_cbcr_end (i.e., IQIDCTe[C]; after completing an IQIDCT operation for chrominance data).

In T6, processing macroblocks in the horizontal direction may not be completed prior to finishing the process for the whole frames and the state may transition from T6→T7→T8→T9→T6. The number of macroblocks which may have been processed may be equal to the number of the entire macroblocks (op_unit=op_cnt) and a horizontal position of a current macroblock may be equal to M (i.e., the number of macroblocks on the horizontal direction) (mx==M) if: a vertical position of a current macroblock may be equal to the number of macroblocks on the vertical direction (my==N), and/or a reconstructed frame may be completely stored (recon_write_end; i.e., RECONwe), i.e., the process for one frame as a whole may be terminated and the state may go to the idle state IDLE from T6 and may wait for a process against a new frame. The number of macroblocks which may have been processed may be less than the number of the entire macroblocks (op_unit!=op_cnt, i.e., the process for one frame as a whole may not have been terminated yet) if: the last macroblock in the horizontal direction may be processed (mx==M), and/or a reconstructed frame may have been stored (recon_write_end; i.e., RECONwe), i.e., when all, or substantially all, macroblocks in the horizontal direction (or line) may be completely processed. The state may go to T0 and may perform for a macroblock on the next horizontal line.

The process for the whole macroblocks may not have been terminated with incompleteness of process for macroblocks in the horizontal line (op_unit!=unit && mx!=M) if: motion compensation for luminance data may have been terminated (mc_y_end), and/or a reconstructed frame may have been stored (recon_write_end). The state may transition to T7 from T6. A luminance quantizing coefficient may be read from the external memory and T7 may go to T8. T8 may go to T9 after motion-compensating for chrominance data (mc_cbcr_end; i.e., MCe[C]), reading a chrominance quantizing coefficient from the external memory (coef_cbcr_read_end; i.e., COEFre[C]), and/or completing an IQIDCT operation for luminance data (iqidct_y_end; IQIDCTe[Y]).

For all, or substantially all, transitions from T9 to T6, the IQIDCT operations for chrominance data (iqidct_cbcr_end; i.e., IQIDCTe[C]) may be completed. The ending operation of luminance data (py_write_end) may be needed for the transition from T9 to T6. The second T9 may end and may become mx[1:0]=3 (the lower two bits are '11'), such that the transition from T9 to T6 may be obtained from the condition iqidct_cbcr_end && (((py_write_end && mx[1:0]== 2'b11||mx[1:0]!=2'b11||mem_mbx==M).

T6 may go to the standby state WAIT and may assist with processing a macroblock in the unit of slice. The process in the unit of slice which may have been established at the T6 may have been completed (op_unit=op_cnt) and the entire frame may not have been completely processed (mx!=M||my!=N). If the unit of slice terminates writing for a reconstructed frame (recon_write_end), and/or if the unit of slice may end motion compensation for luminance data with regard to the last macroblock in the horizontal direction (mc_y_end||mx==M), T6 may transition to the standby state WAIT.

In the standby state WAIT, the operation start signal op_start (i.e., OPs) may be generated from the control register and the process for all the macroblocks in the horizontal direction (or line) may be ended (mx==M), the state may go to T0. The process for all the macroblocks in the horizontal direction may not have been completed (mx!=M) and the sliced-processing start signal op_start may be enabled by the control register, and the state may transition to T7 from the standby state WAIT.

Figure 16D:
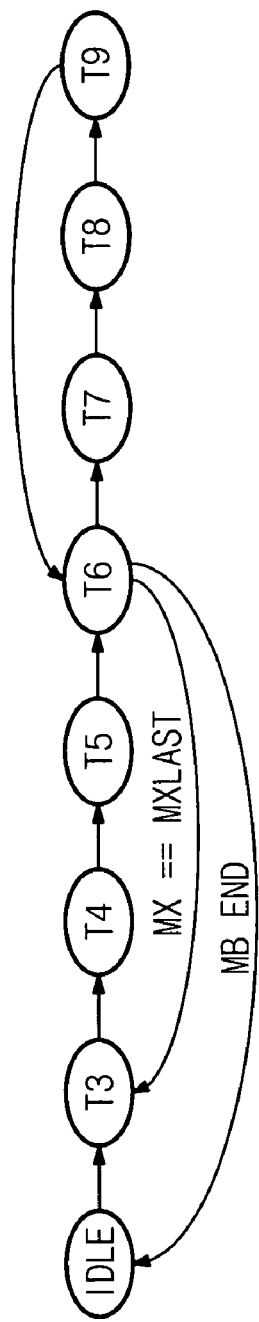
Figure 20:
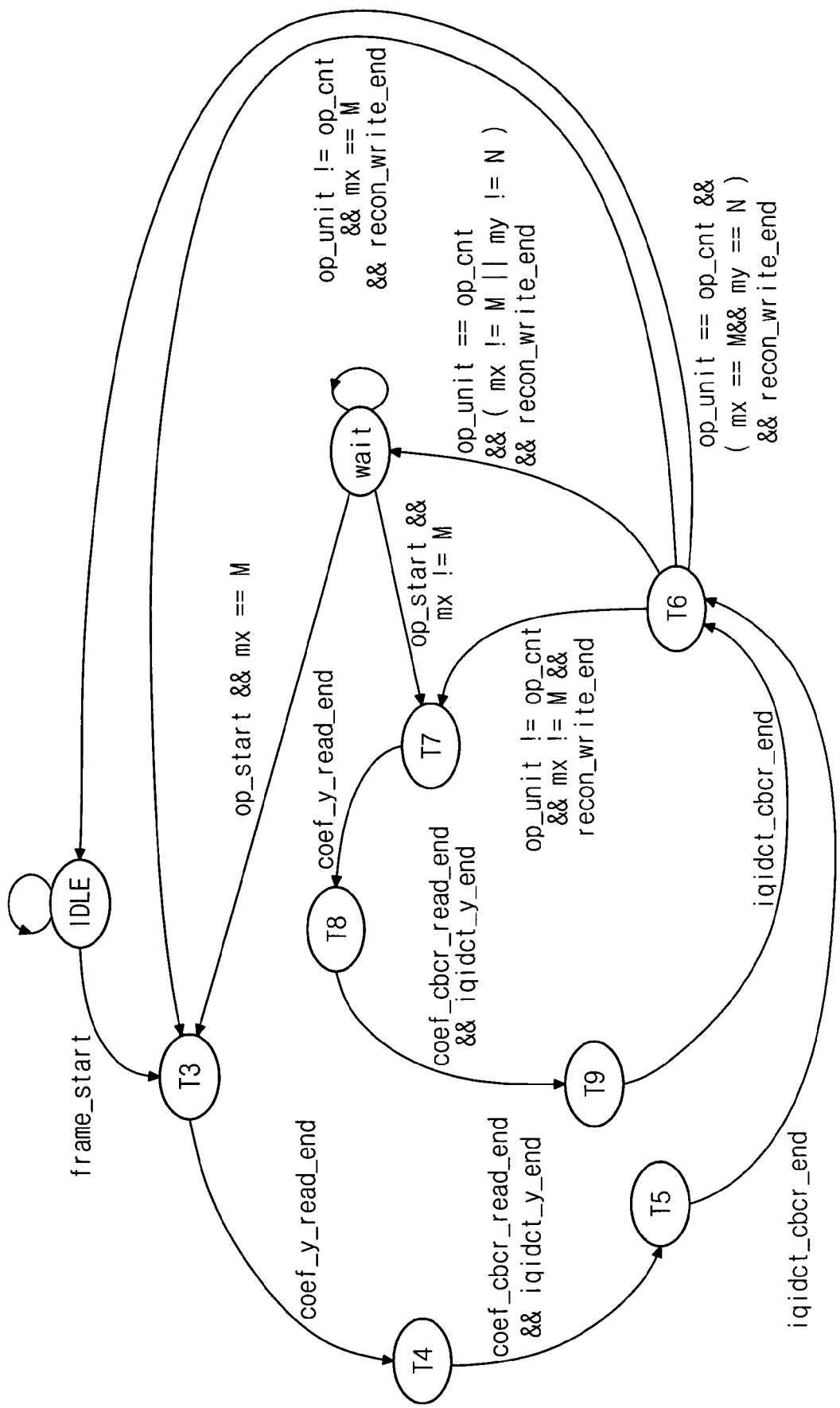

Referring to FIGS. 20, 15B, and 16D, the state may transition from an idle state IDLE to T3 by the signal frame_start (i.e., Fs) of the control register. T3 may go to T4 in response to the signal coef_y_read_end (i.e., COEFre[Y]). T4 may go to T5 in response to the signal coef_cbcr_read_end (i.e., COEFre[C]) and the signal iqidct_y_end (i.e., IQIDCTe[Y]). T5 may go to T6 in response to the signal iqidctc_cbcr_end (i.e., IQIDCTe[C]).

Intra-decoding mode may not perform the motion compensation, the transitions from T6 to the standby state WAIT and/or T7 may be as same, or substantially the same, as those of the inter-decoding mode shown in FIG. 19, but may not include the luminance motion-compensating end signal mc_y_end (i.e., MCe[Y]). The transition processes from T6 to the idle state IDLE and/or T3 may be the same, or substantially the same, as those of the inter-decoding mode shown in FIG. 19. The transition processes from the standby state WAIT to T3 and/or T7 may also be the same, or substantially the same, as those of the inter-decoding mode shown in FIG. 19.

FIGS. 21, 22, 23, and 24 illustrate examples of generating procedures of the task control signals for the memory pool, the motion estimator, the motion compensator, and/or the DCTQ.

In FIG. 21, the signal horizontal_end (i.e., HORZe) may be provided to inform of when the number of macroblocks remaining in the horizontal direction may be, for example, less than 3. A horizontal position of a macroblock may be denoted by 6 bits, for example, in VGA resolution. Horizontal macroblocks may be divided into at least 4 units and the number of the remaining macroblocks may be 0, 1, 2, or 4. For example, the higher 4 bits of mem_mbx (i.e., MEMmbx) may be the same, or substantially the same, as the higher 4 bits of mxlast (i.e., when the number of macroblocks remaining on a horizontal line may be in the range of 0~3), the signal horizontal_end (HORZe) may be generated. mx may have one of values '111100', '111101', 111110', and '111111'. The signal horizontal_end may be generated and, the remaining macroblocks may be stored in the data memory. If all, or substantially all, of the macroblocks in the horizontal direction (or line) may have been completely processed (mx==M) and/or the slice-unit process may be ended, the signal horizontal_end may be disabled to perform an access to the memory for the next horizontal line and/or a macroblock of the first horizontal line of the next frame.

In the inter-coding mode, T6 may generate (and/or enable) the signal py_write (i.e., PYw) when the lower two bits of mx may be '11' and may perform a memory writing operation with the luminance block PY of the previous frame. In the inter-coding mode, T9 may generate the signal ccbccr_write (i.e., CCBRw) when the lower two bits of mx may be '11' and may perform a memory writing operation with the chrominance blocks CCb and/or CCr of the current frame. T9 may generate the signal cy_write (i.e., CYw) when the lower two bits of mx may be '10' and may perform a memory writing operation for the luminance block CY of the current frame.

There need not be operation of motion estimation, the signal py_write (i.e., PYw) may not be generated (or disabled) while the signals for instructing memory-writing operations with the luminance block CY and/or the chrominance blocks CCb and/or CCr of the current frame, cy_write (i.e., CYw) and/or ccbccr_write (i.e., CCBRw), may be enabled. In T9, the signal ccbccr_write may be generated and may enable a memory-writing operation for the chrominance blocks CCb and/or CCr of the current frame when the lower two bits of mx may be '11', while the signal py_write may be generated and may enable a memory-writing operation for the luminance block of the previous frame when the lower two bits of mx may be '10'.

The signal py_write (PYw) may be generated in the inter-decoding mode and in T6, the signal py_write may be generated to enable a memory-writing operation for the luminance block of the previous frame when the lower two bits of mx may be '11'.

Referring to FIG. 22, the task scheduler 361 may generate the start signals me_start (MEs) and/or mv_start (MVs) to enable motion estimation and/or a motion-vector transfer task by the motion estimator 321 in the inter-mode.

Referring to FIG. 23, the task scheduler 361 may generate start signals mc_start (MCs) and/or mc_cbcr_start (MVs) to enable motion compensation for the luminance and/or chrominance data by the motion compensator 331.

Referring to FIG. 24, the task scheduler 361 may apply the signals dctq_y_start (DCTQs[Y]), dctq_cbcr_start (DCTQs [C]), coef_y_write (COEFw[Y]), recon_write (RECONw), and/or coef_cbcr_write (COEFw[C]) to the DCTQ 301 during the inter/intra-coding mode. In the inter/intra-decoding mode, the signals coef_y_read (COEFr[Y]), coef_cbcr_read (COEFr[C]), iqidct_y_start (IQIDCTs[Y]), iqidct_cbcr_start (IQIDCTs[C]), and/or recon_write (RECONw) may be provided to the DCTQ 301 from the task scheduler 361.

Figure 25:
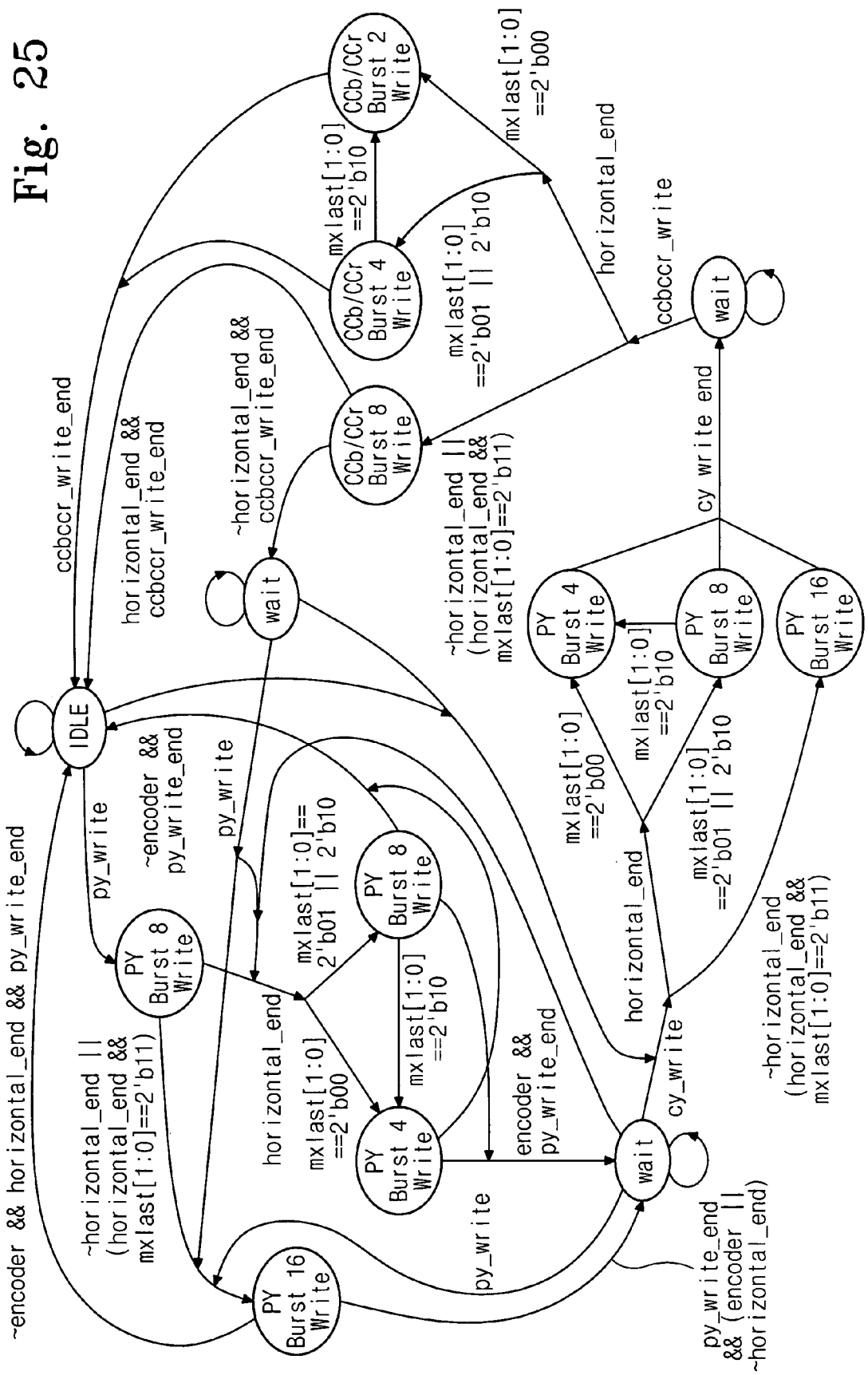
FIG. 25 is an example of a transitional diagram of an exemplary embodiment of the memory pool.

FIG. 25 illustrates an example of features of state transitions in the memory pool 341. The memory pool may be divided into a quest-field data memory PY, a reference-macroblock luminance data memory CY, and a reference-macroblock chrominance data memory which may receive and store corresponding data from the external frame memory. The memory pool may be operable with the task control signals from the task scheduler 361 and may inform the task scheduler 361 of operational ends of the signals. The memory pool may access the frame memory through the task start signals py_write (PYw), cy_write (CYw), and/or ccbccr_write (CCBRw), may generate the task end signals py_write_end (PYwe), cy_write_end (CYwe), and/or ccbcr_write_end (CCBRwe) corresponding to the task start signals when the access to the frame memory may be terminated, and may enter into a standby state.

The memory pool may perform tasks in compliance with the task start signals from the task scheduler. The quest-field data memory PY, the data may be accessed with a burst length of 8, for example, initially, and may be accessed with a burst length of 16 (~horizontal_end), in response to the signal py_write (PYw) which may instruct a memory-writing operation for the quest-field data, in a coding mode at the idle state IDLE. While accessing with a burst length of 16, the macroblocks which may remain on the horizontal direction may be less than or equal to 3 (horizontal_end && mxlast[1:0]==2'b11), the macroblocks may be accessed with a burst length of 16 in accordance with the padding regions. The number of macroblocks remaining in the horizontal direction may be 0 (mxlast[1:0]==2'b00) and the data may be accessed with a burst length of 4 in accordance with the padding regions. The remaining macroblocks on the horizontal direction may be 2 or 1 (mxlast[1:0]==2'b01||2'b10) and the data may be accessed with a burst length of 8, for example, initially with a burst length of 4 in accordance with the padding regions.

When there may be a receipt of the signal cy_write (CYw) from the task scheduler in the standby state WAIT, luminance data from the external frame memory may be stored in the reference-macroblock luminance data memory. The reference-macroblock luminance data may be accessed with a burst length of 16 (~horizontal_end). The number of horizontal macroblocks may be less than, or equal to, 3 while accessing with a burst length of 16 and the signal horizontal_end (HORZe) may be enabled. Macroblocks remaining in the horizontal direction may be 3 (horizontal_end && mxlast[1:0]==2'b11) and the data may be accessed with a burst length of 16 in accordance with the padding regions. The number of macroblocks remaining on the horizontal direction may be 0 (mxlast[1:0]==2'b00) and the data may be accessed with a burst length of 4 in accordance with the padding regions. The remaining macroblocks on the horizontal direction may be 1 or 2 (mxlast[1:0]==2'b01||2'b10) and the data may be accessed with a burst length of 8 (for example, initially) and with a burst length of 4 in accordance with the padding regions.

When there the signal ccbccr_write (CCBRw) may be generated from the task scheduler in the standby state WAIT, chrominance data from the external frame memory may be stored in the reference-macroblock chrominance data memory. The reference-macroblock chrominance data may be accessed with a burst length of 8 (~horizontal_end). The number of horizontal macroblocks may be less than, or equal to, 3 while accessing with a burst length of 8 and the signal horizontal_end (HORZe) may be enabled. Macroblocks remaining in the horizontal direction may be 3 (horizontal_end && mxlast[1:0]==2'b11) and the data may be accessed with a burst length of 8 in accordance with the padding regions. The number of macroblocks remaining in the horizontal direction may be 0 (mxlast[1:0]==2'b00) and the data may be accessed with a burst length of 2 (e.g., a single mode) in accordance with the padding regions. The remaining macroblocks in the horizontal direction may be 1 or 2 (mxlast[1:0]==2'b01||2'b10) and the data may be accessed with a burst length of 4 (for example, initially) and with a burst length of 2 in accordance with the padding regions.

Figure 26:
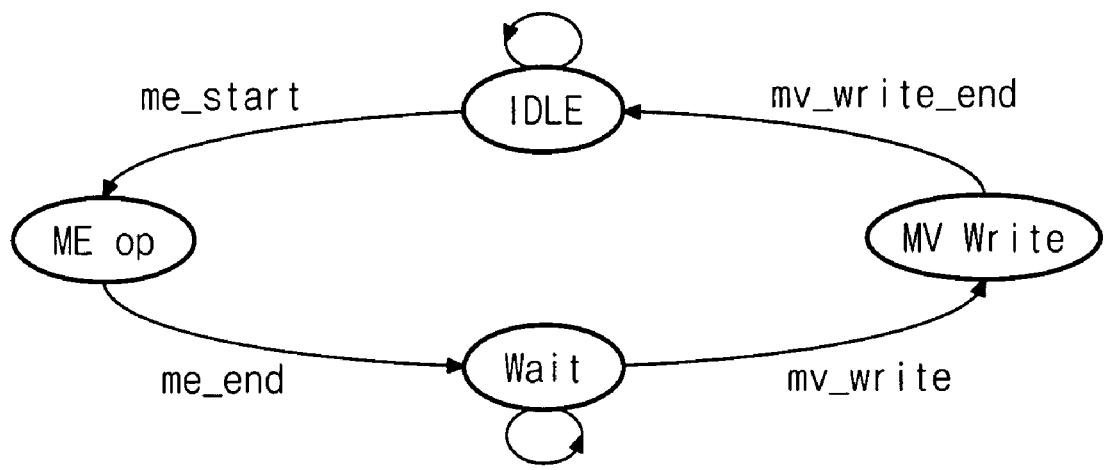
FIG. 26 is an example of a transitional diagram of an exemplary embodiment of the motion estimator.

Referring to FIG. 26, the motion estimator 321 may be set in a motion-estimating operation state (ME_op) in response to the motion-estimation start signal me_start (MEs), which may have been received from the task scheduler 361 in the idle state IDLE, and may go to the standby state WAIT by generating the motion-estimation end signal me_end (MEe). From the standby state WAIT, the motion estimator may transition to a motion-vector writing state (MV_write) in response to the motion-vector writing start signal mv_write (MVw), in which a motion vector may be written into the external memory. After completing the motion-vector writing operation, the motion estimator may generate the motion-vector writing end signal mv_write_end (MVwe) and may go to the idle state IDLE.

Figure 27:
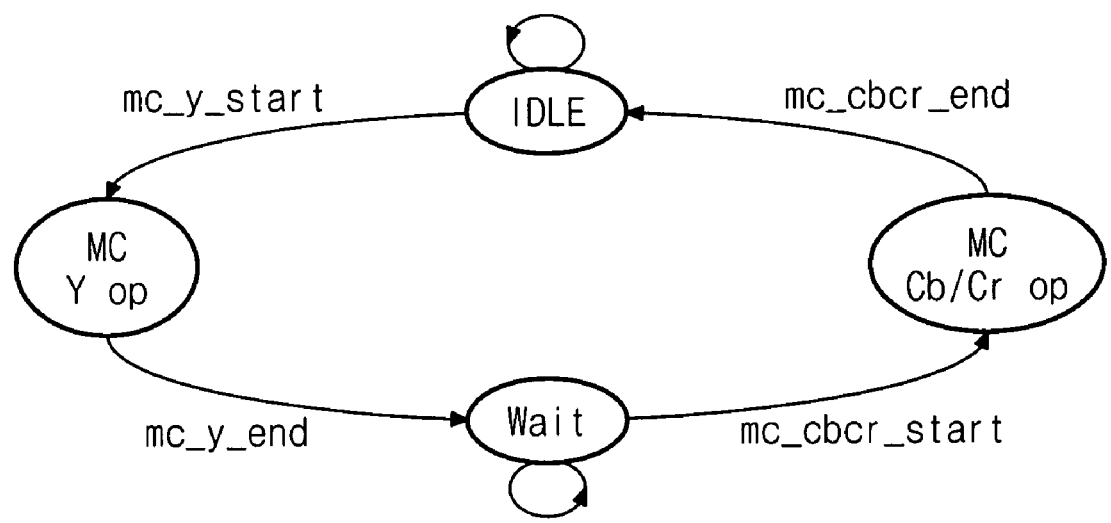
FIG. 27 is an example of a transitional diagram of an exemplary embodiment of the motion compensator.

Referring to FIG. 27, the motion compensator 331 may perform separate motion-compensating operations respective to luminance and/or chrominance data which may make the pipelining process more efficient. The motion compensation for the luminance data may be performed in response to the signal mc_y_start (MCs[Y]), which may begin from the idle state IDLE, and may generate the signal mc_y_end (MCe[Y]) to go to the standby state WAIT. From the standby state WAIT, the motion compensator 331 may transition to the motion-compensating state (MC_Cb/Cr_op) for the chrominance data in response to the signal mc_cbcr_start (MCs[C]) and may go to the idle state IDLE in response to the signal mc_cbcr_end (MCe[C]).

Figure 28:
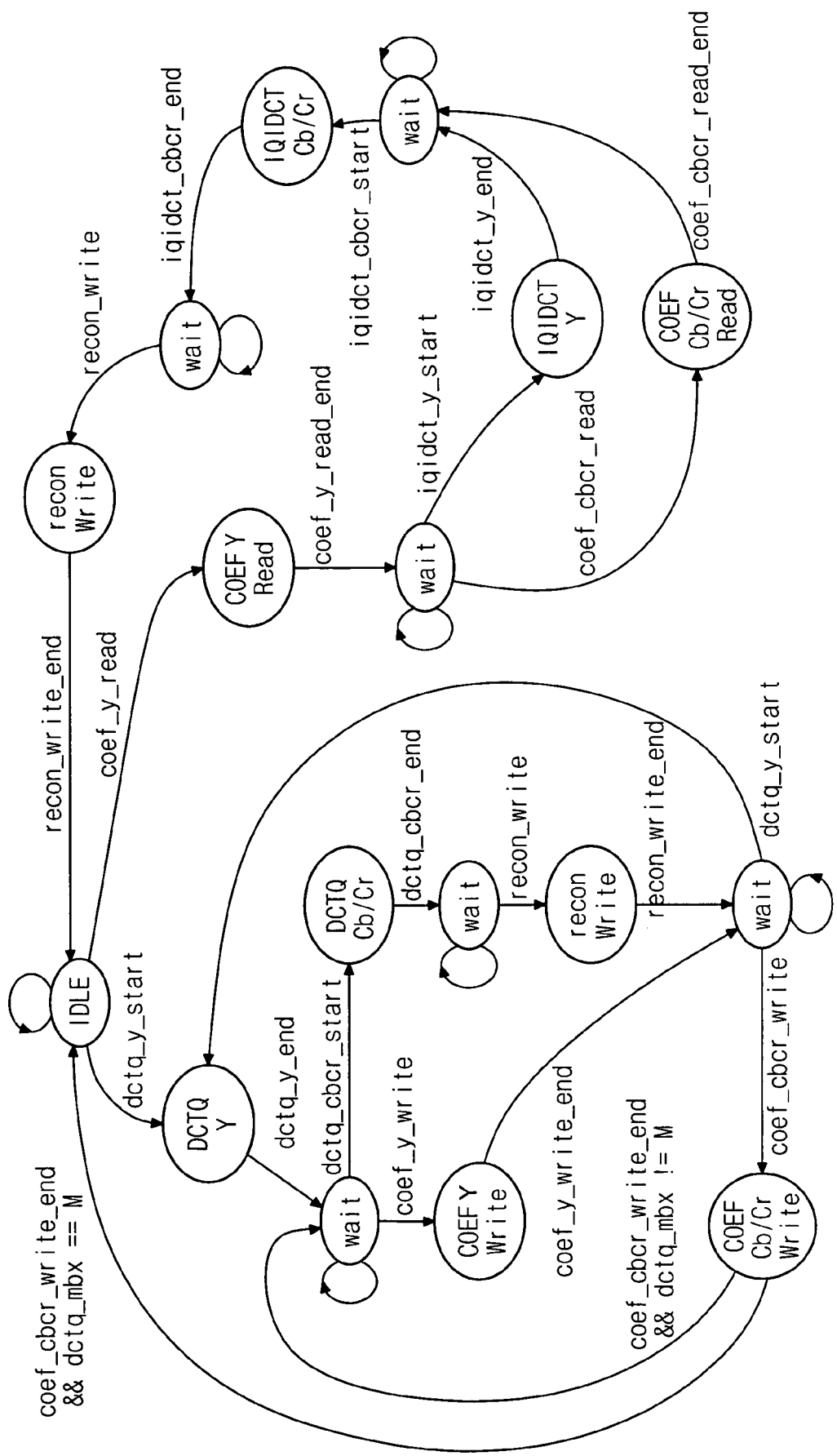
FIG. 28 is an example of a transitional diagram of an exemplary embodiment of the discrete cosine transform quantizer.

Referring to FIG. 28, the DCTQ 301 may be operable with an idle state IDLE, a state of performing a DCTQ operation for luminance data (DCTQ_Y), a state of storing quantizing coefficients for the luminance data in the external memory (COEF_Y_Write), a state of performing a DCTQ operation for chrominance data (DCTQ_Cb/Cr), a state of storing quantizing coefficients for the chrominance data in the external memory (COEF_Cb/Cr_Write), a state of storing a reconstructed frame (RECON_Write), a state of reading quantizing coefficients for the luminance data from the external memory (COEF_Y_Read), a state of reading quantizing coefficients for the chrominance data from the external memory (COEF_Cb/Cr_Read), a state of performing a IQIDCT operation for luminance data (IQIDCT_Y), a state of performing a IQIDCT operation for chrominance data (IQIDCT_Cb/Cr), and/or a standby state WAIT. Between the states, the standby state WAIT may be interposed, and may be transitioned from state to state in response to the task end signals respective to the states, e.g., dctq_y_end (DCTQe[Y]), coef_y_write_end (COEFwe[Y]), recon_write_end (RECONwe), and/or dctq_cbcr_end (DCTQe[C]), coef_cbcr_write_end (COEFwe[C]), in the coding modes; and/or coef_y_read_end (COEFre[Y]), iqidct_y_end (IQIDCTe[Y]), coef_cbcr_read_end (COEFre[C]), iqidct_cbcr_end (IQIDCTe[C]), and/or recon_write_end (RECONwe), in the decoding modes. Those states may be enabled from the standby state WAIT in response to the task start signals: in the coding mode, dctq_y_start (DCTQs[Y]), coef_y_write (COEFw[Y]), dctq_cbcr_start (DCTQs[C]), recon_write (RECONw), and/or coef_cbcr_start (COEFs[C]); in the decoding modes, coef_y_read (COEFr[Y]), iqidct_y_start (IQIDCTs[Y]), coef_cbcr_read (COEFr[C]), iqidct_cbcr_start (IQIDCTs[C]), and/or recon_write (RECONw).

From the idle state IDLE, the coding (or encoding) mode may begin in response to the signal dctq_y_start (DCTQs[Y]) and the decoding mode begins in response to the signal coef_y_read (COEFr[Y]). In the decoding mode, a coding operation for luminance data may be ended, all processes for horizontal macroblocks may be completed, and the state may transition to the idle state IDLE and may wait for the signal dctq_y_start (DCTQs[Y]) which may instruct a process for macroblocks in the next horizontal line. In the decoding mode, the DCTQ may transition to the idle state IDLE after completing the storage of reconstructed frame.

A VLC operation may be performed by a quantizing coefficient for luminance data when the signal dctq_y_end (DCTQe[Y]) may be enabled. The signal dctq_cbcr_end (DCTQe[C]) may be generated and a VLC operation may be performed with a quantizing coefficient for chrominance data. The state DCTQ_Y may be completed and may forward directly, or indirectly, to the VLC operation with the result (i.e., the quantizing coefficient of luminance data) of the DCTQ task for luminance data through the VLC 353. The state DCTQ_Cb/Cr may be completed and may forward directly, or indirectly, to the VLC operation with the result (i.e., the quantizing coefficient of chrominance data) of the DCTQ task for luminance data through the VLC 353.

Figure 29:
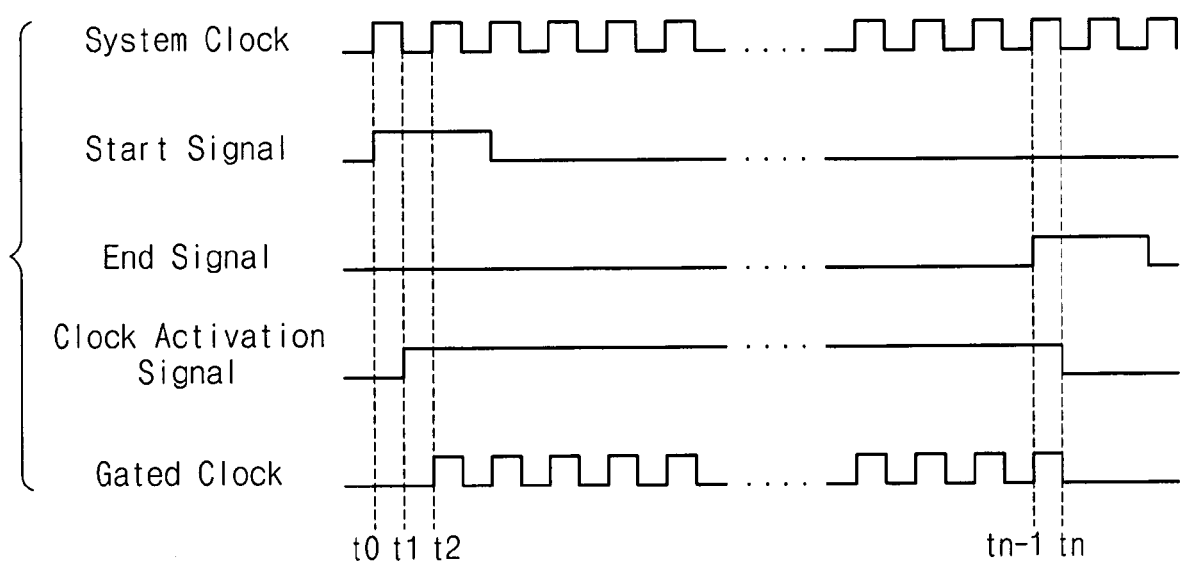
FIG. 29 is an example of a timing diagram which may illustrate a dynamic clock-gating method which may provide a system clock when the data processing units may be operative.

Exemplary embodiments of the present invention may utilize at least two ways of reducing power consumption of a video codec. Power management which may not supply a system clock to data processing units inoperable in the inter and/or intra cooling modes and/or a dynamic clock-gating method, which may supply a system clock during real prosecution terms because the data processing units may perform the pipelining operations according to the tasks and/or may have different prosecution times. As functional prosecutions of the data processing units may be operable in periods between the start signals, which may be generated from the task scheduler, and/or the end signals, informing the end of the prosecutions, the system clock may be supplied to the data processing units during prosecution periods t1~tn as shown in FIG. 29.

The start signal may be active at time t0 and a clock enable activation signal may be enabled at a falling edge of the system clock at time t1. The end signal may be active at the time tn−1 and a clock enable activation signal may be disabled at a falling edge of the system clock at the time tn. The system clock may be gated during the period t1~tn (i.e., when the data processing units may be performing their operations).

Although exemplary embodiments of the present invention have been described as illustrated in the accompanying drawings, it is not limited thereto. It will be apparent to those skilled in the art that various substitution, modifications and changes may be thereto without departing from the scope and spirit of the invention.

Although exemplary embodiments of the memory pool have been described as including quest-field memory, a motion compensated memory, and a reference-macroblock memory, it will be understood that any memory of any size, which may be suitable to perform similar, or substantially similar, operations may be utilized and/or implemented by one of ordinary skill in the art.

Although exemplary embodiments of the data processing units and memory pool have been described herein, it will be understood that any, either alone or in combination, of the data processing units may share any, either alone or in combination, of the internal memories within the memory pool.

Although exemplary embodiments of the frame memories have been described as burst-accessible synchronous DRAMS, it will be understood by one of ordinary skill in the art that any memory suitable to perform similar, or substantially suitable functions may be utilized and/or implemented by one of ordinary skill in the art.

Although components which may be included in exemplary embodiments of the present invention (for example, the data processing units) have been described as operating independently, it will be understood that any component or subcomponent of exemplary embodiments of the present invention may operate dependently or independently, as desired by one of ordinary skill in the art.

Although exemplary embodiments of the present invention have been described as including four macroblocks, it will be understood that any number of macroblocks may be utilized as desired by one of ordinary skill in the art. It will also be understood that these macroblocks may be any suitable size as desired by one of ordinary skill in the art.

Although exemplary embodiments of the present invention have been described as utilizing states of '1' and/or '0', it will be understood that any suitable state may be utilized as desired by one of ordinary skill in the art.

Although exemplary embodiments of the present invention have been described as utilizing certain memory sizes, structures, and/or configurations, it will be understood that any suitable size, structure, and/or configuration may be utilized as desired by one of ordinary skill in the art.

Although exemplary embodiments of the present invention are directed to a video coder and/or decoder, it will be understood that exemplary embodiments of the present invention may be applied to audio information, as desired by one of ordinary skill in the art.

Exemplary embodiments of the present invention may be advantageous to simplify the overall operation of a video codec, for which the task scheduler may provide the task start signals to enable tasks of the data processing units such as the motion estimator, the motion compensator, and/or the DCTQ and after completing the tasks, the data processing units may inform the task scheduler of their task ends.

The data processing units may share the memory pool to store their common data, which may improve the size of the data processing units and/or reduce bandwidth requirements for external memories.

Exemplary embodiments of the present invention may reduce power consumption in the system because the system clock may be supplied during the periods when the data processing units may be conductive, or substantially conductive, and may not supply the system clock to the data processing units which may be inoperable in each mode.

What is claimed is:

1. A data processing system comprising:
a plurality of data processing units; and
a task scheduler for controlling the data processing units, through tasks associated with a plurality of operations, to pipeline operations;
a control register for establishing functions of the data processing units; and
an internal memory pool for storing data used in the operations of the data processing units, wherein the data processing units include,
  a discrete cosine transforming quantizer including a discrete cosine transformer, an inverse discrete cosine transformer, a quantizer, and an inverse quantizer, a motion estimator, and a motion compensator, for coding MPEG motion pictures, and
the internal memory pool includes,
  motion-compensated luminance and chrominance data memories for storing luminance and chrominance data motion-compensated by the motion compensator,
  reference-macroblock luminance and chrominance data memories for storing luminance and chrominance data of a currently input frame retrieved from a frame memory, and
  a quest-field data memory for storing luminance data obtained from a reconstructed frame prior to the currently input frame retrieved from the frame memory, wherein
    the internal memory pool performs a task for storing data into the data memories from an external frame memory in response to frame memory control signals supplied from the task scheduler, and provides data stored in the data memories to the data processing units in response to data memory control signals supplied from the data processing units.

2. The data processing system as set forth in claim 1, wherein the task scheduler applies task start signals to the data processing units and receives task end signals from the data processing units; and
wherein the data processing units perform tasks in response to the task start signals and apply the task end signals to the task scheduler to indicate ends of the tasks.

3. The data processing system as set forth in claim 1, wherein the motion estimator and the motion compensator share the quest-field data memory;
  the discrete cosine transformer and the inverse discrete cosine transformer share the motion-compensated data memory; and
  the motion estimator and the discrete cosine transformer share the reference-macroblock data memory.

4. The data processing system as set forth in claim 1, wherein the motion estimator estimates a motion and transfers a motion vector;
  the motion compensator compensates motions of luminance and chrominance data; and
  the discrete cosine transforming quantizer DCTQ operations with luminance and chrominance data, and writes a reconstructed frame;
    wherein the luminance and chrominance data are processed with variable length coding and decoding operations by a variable length coder and decoder.

5. The data processing system as set forth in claim 2, wherein the data processing units are provided with a system clock during periods between the task start signals and the task end signals.

6. The data processing system as set forth in claim 1, wherein the data processing units are provided with a system clock during periods between the task start signals and the task end signals.

7. The data processing system as set forth in claim 1, wherein
  the motion estimator and the motion compensator are isolated from a system clock when the data processing system is operating in an intra-coding mode by the control register;
  the motion estimator is isolated from the system clock when the data processing system is operating in an inter-decoding mode; and
  the memory pool, the motion estimator, and the motion compensator are isolated from the system clock when the data processing system is operating in an intra-decoding mode.

8. A video codec comprising:
data processing units including a discrete cosine transforming quantizer including a discrete cosine transformer, an inverse discrete cosine transformer, a quantizer, and an inverse quantizer, for coding MPEG motion pictures, a motion estimator, and a motion compensator;
an internal memory pool for storing common data shared by the data processing units;
a task scheduler for controlling the data processing units to be operable in pipelining operations by tasks associated with a plurality of operations; and
a control register for establishing functions of the data processing units, wherein the internal memory pool includes,
  motion-compensated luminance and chrominance data memories for storing luminance and chrominance data motion-compensated by the motion compensator,
  reference-macroblock luminance and chrominance data memories for storing luminance and chrominance data of a currently input frame retrieved from a frame memory, and
  a quest-field data memory for storing luminance data abstracted from a reconstructed frame prior to the currently input frame retrieved from the frame memory.

9. The video codec as set forth in claim 8, wherein the internal memory pool further comprises:
  an internal data memory controller for providing data to the data processing units in response to internal data memory control signals supplied from the data processing units;
  a frame memory controller for accessing the frame memory and controlling to store data into the reference-macroblock data memory and the quest-field data memory; and
  a task controller for transferring task start signals to the frame memory from the task scheduler and transferring task end signals to the task scheduler when the tasks are completed.

10. The video codec as set forth in claim 8, wherein the task scheduler generates task start signals to instruct the data processing units and the internal memory pool to perform the tasks, by which the data processing units and the internal memory pool provide task end signals to the task scheduler and go to standby state to wait for the next task instructions.

11. The video codec as set forth in claim 9, wherein the task scheduler generates the task start signals to instruct the data processing units and the internal memory pool to perform the tasks, by which the data processing units and the internal memory pool provide the task end signals to the task scheduler and go to standby state to wait for the next task instructions.

12. The video codec as set forth in claim 8, wherein the motion estimator comprises:
  a motion-estimating engine for evaluating a motion vector with a luminance macroblock retrieved from the quest-field data memory and the reference-macroblock luminance memory;

a motion-vector transfer controller for transferring the motion vector to the motion compensator and a variable length coder;

a motion-estimating task controller for receiving a task start signal from the task scheduler and transferring a task end signal to the task scheduler; and a motion-estimating internal data memory read controller for generating an internal data memory control signal to retrieve the luminance data from the quest-field data memory and the reference-macroblock luminance memory.

13. The video codec as set forth in claim 8, wherein the motion compensator comprises:

a motion-vector analyzer for analyzing a motion vector that is provided from the motion estimator in a coding mode while from a variable length decoder in a decoding mode;

a motion-compensating engine for performing motion compensation with luminance and chrominance data with reference to the analyzed motion vector;

a motion-compensating task controller for receiving a task start signal from the task scheduler and transferring a task end signal to the task scheduler;

a motion-compensating internal data memory read/write controller for generating an internal data memory control signal to retrieve data from the quest-field data memory and an internal data memory control signal to write the motion-compensated luminance and chrominance data into the motion-compensated data memories; and a frame-memory read controller for generating a frame-memory read control signal to retrieve the chrominance data from the frame memory.

14. The video codec as set forth in claim 12, wherein the motion compensator comprises:

a motion-vector analyzer for analyzing the motion vector that is provided from the motion estimator in a coding mode while from the variable length decoder in a decoding mode;

a motion-compensating engine for performing motion compensation with the luminance and chrominance data with reference to the analyzed motion vector;

a motion-compensating task controller for receiving the task start signal from the task scheduler and transferring the task end signal to the task scheduler;

a motion-compensating internal data memory read/write controller for generating the internal data memory control signal to retrieve the luminance data from the quest-field data memory and the internal data memory control signal to write the motion-compensated luminance and chrominance data into the motion-compensated data memories; and a frame-memory read controller for generating a frame-memory read control signal to retrieve chrominance data from the frame memory.

15. The video codec as set forth in claim 8, wherein the discrete cosine transforming quantizer further comprises:

a DCTQ task controller for receiving a task start signal from the task scheduler and transferring a task end signal to the task scheduler;

a DCTQ internal data memory read controller for generating an internal data memory control signal to retrieve luminance and chrominance data from the reference-macroblock data memories and the motion-compensated luminance and chrominance data from the motion-compensated data memories; and a DCTQ frame memory write controller for storing a reconstructed frame into the frame memory.

16. The video codec as set forth in claim 12, wherein the discrete cosine transforming quantizer further comprises:

a DCTQ task controller for receiving the task start signal from the task scheduler and transferring the task end signal to the task scheduler;

a DCTQ internal data memory read controller for generating the internal data memory control signal to retrieve luminance and chrominance data from the reference-macroblock data memories and the motion-compensated luminance and chrominance data from the motion-compensated data memories; and a DCTQ frame memory write controller for storing a reconstructed frame into the frame memory.

17. The video codec as set forth in claim 13, wherein the discrete cosine transforming quantizer further comprises:

a DCTQ task controller for receiving the task start signal from the task scheduler and transferring the task end signal to the task scheduler;

a DCTQ internal data memory read controller for generating the internal data memory control signal to retrieve chrominance data from the reference-macroblock chrominance data memory and the motion-compensated luminance and chrominance data from the motion-compensated data memories; and a DCTQ frame memory write controller for storing a reconstructed frame into the frame memory.

18. The video codec as set forth in claim 8, wherein the data processing units are provided with a system clock during periods between task start signals and task end signals.

19. The video codec as set forth in claim 9, wherein the data processing units are provided with a system clock during periods between the task start signals and the task end signals.

20. The video codec as set forth in claim 8, wherein the data processing units further includes a variable length coder and decoder.

21. The video codec as set forth in claim 8, wherein the motion estimator and the motion compensator are isolated from a system clock when the data processing system is operating in an intra-coding mode by the control register;

the motion estimator is isolated from the system clock when the data processing system is operating in an inter-decoding mode; and the internal memory pool, the motion estimator, and the motion compensator are isolated from the system clock when the data processing system is operating in an intra-decoding mode.

22. The video codec as set forth in claim 13, wherein the motion estimator performs tasks for estimating a motion vector and transferring the motion vector;

the motion compensator performs tasks for compensating motions of luminance and chrominance data; and the frame memory controller of the memory pool controls tasks for writing luminance data of a previous frame, and luminance and chrominance data of a current frame into the data memories of the memory pool from the frame memory;

wherein the luminance and chrominance data are processed with variable length coding and decoding operations by the variable length coder and decoder.

23. A video codec comprising:

data processing units including a discrete cosine transforming quantizer including a discrete cosine transformer, an inverse discrete cosine transformer, a quantizer, and an inverse quantizer, for coding MPEG motion pictures, a motion estimator, and a motion compensator; and an internal memory pool for storing common data shared by the data processing units; wherein the internal memory pool includes,
- motion-compensated luminance and chrominance data memories for storing luminance and chrominance data motion-compensated by the motion compensator;
- reference-macroblock luminance and chrominance data memories for storing luminance and chrominance data of a currently input frame retrieved from a frame memory; and
- a quest-field data memory for storing luminance data abstracted from a reconstructed frame prior to the currently input frame retrieved from the frame memory;
  - wherein the motion estimator and the motion compensator share the quest-field data memory; the discrete cosine transformer and the inverse discrete cosine transformer share the motion-compensated data memory; and the motion estimator and the discrete cosine transformer share the reference-macroblock data memory.

24. The video codec as set forth in claim 23, further comprising:
a task scheduler for controlling the data processing units to be operable in pipelining operations by tasks associated with a plurality of operations, wherein
- the task scheduler applies task start signals to the data processing units and receives task end signals from the data processing units; and
- the data processing units perform own tasks in response to the task start signals and applies the task end signals to the task scheduler to inform ends of the tasks.

25. A method of processing data in a video codec having data processing units including a discrete cosine transforming quantizer including a discrete cosine transformer, an inverse discrete cosine transformer, a quantizer, and an inverse quantizer, for coding MPEG motion pictures, a motion estimator, a motion compensator, and a variable length coder/decoder, the method comprising;
storing common data shared by the data processing units in an internal memory pool, wherein the storing the common data includes,
- storing luminance and chrominance data motion-compensated by the motion compensator in motion-compensated luminance and chrominance data memories,
- storing luminance and chrominance data of a currently input frame retrieved from a frame memory in reference-macroblock luminance and chrominance data memories, and
- storing luminance data abstracted from a reconstructed frame prior to the currently input frame retrieved from the frame memory in a quest-field data memory, performing tasks by the data processing units in response to task start signals provided from a task scheduler, generating task end signals by the data processing units to inform ends of the tasks when the tasks are completed, and then establishing the data processing units in standby states to wait for the next task start signals; and transitioning of the tasks by the task scheduler in response to the task end signals.

26. The method as set forth in claim 25, wherein the data processing units are provided with a system clock during periods between the task start signals and the task end signals.

27. The method as set forth in claim 25, wherein
the motion estimator and the motion compensator are isolated from a system clock when the data processing system is operating in an intra-coding mode by the control register;
the motion estimator is isolated from the system clock when the data processing system is operating in an inter-decoding mode; and
the internal memory pool, the motion estimator, and the motion compensator are isolated from the system clock when the data processing system is operating in an intra-decoding mode.

* * * * *